United States Patent
Wolak et al.

(10) Patent No.: US 12,528,280 B2
(45) Date of Patent: Jan. 20, 2026

(54) MACHINE-DIRECTION ORIENTED POLYMERIC FILM AND METHOD OF MAKING THE SAME

(71) Applicant: BERRY GLOBAL, INC., Evansville, IN (US)

(72) Inventors: Paul Z. Wolak, Indianapolis, IN (US); Bryan S. Gillespie, Eau Claire, WI (US); Christopher E. King, Sun Prairie, WI (US)

(73) Assignee: BERRY GLOBAL, INC., Evansville, IN (US)

( * ) Notice: Subject to any disclaimer, the term of this patent is extended or adjusted under 35 U.S.C. 154(b) by 0 days.

(21) Appl. No.: 19/035,103

(22) Filed: Jan. 23, 2025

(65) Prior Publication Data
US 2025/0236103 A1     Jul. 24, 2025

Related U.S. Application Data

(60) Provisional application No. 63/624,000, filed on Jan. 23, 2024.

(51) Int. Cl.
*B29C 48/00*     (2019.01)
*B29C 48/08*     (2019.01)
(Continued)

(52) U.S. Cl.
CPC .......... *B32B 37/24* (2013.01); *B29C 48/0018* (2019.02); *B29C 48/022* (2019.02); *B29C 48/08* (2019.02); *B29C 48/21* (2019.02); *B29C 48/22* (2019.02); *B32B 7/12* (2013.01); *B32B 27/08* (2013.01); *B32B 27/32* (2013.01); *B32B 33/00* (2013.01); *B32B 37/12* (2013.01); *B32B 37/153* (2013.01); *C09D 129/04* (2013.01); *C09D 177/06* (2013.01); *B29K 2995/0051* (2013.01); *B29L 2007/008* (2013.01); *B32B 2037/243* (2013.01); *B32B 2255/10* (2013.01); *B32B 2255/205* (2013.01); *B32B 2255/26* (2013.01); *B32B 2255/28* (2013.01); *B32B 2307/516* (2013.01); *B32B 2307/7244* (2013.01); *B32B 2307/7246* (2013.01);
(Continued)

(58) Field of Classification Search
None
See application file for complete search history.

(56) References Cited

U.S. PATENT DOCUMENTS

| 5,153,074 A | 10/1992 | Migliorini |
| 5,529,834 A * | 6/1996 | Tsai ........... B32B 27/32 |
| | | 156/244.11 |

(Continued)

FOREIGN PATENT DOCUMENTS

| AT | 526598 B1 | 5/2024 |
| EP | 3256317 B1 | 9/2019 |

(Continued)

OTHER PUBLICATIONS

International Search Report and Written Opinion for PCT/US2025/012741 mailed Mar. 28, 2025, 8 pages.

*Primary Examiner* — Mohammad M Ameen
(74) *Attorney, Agent, or Firm* — Barnes & Thornburg LLP

(57) ABSTRACT

A formulation and method for producing a multilayer film and a coated multilayer film comprising a barrier layer including a polar polymer resin, such as EVOH, as described.

20 Claims, 12 Drawing Sheets

(51) Int. Cl.
  *B29C 48/21* (2019.01)
  *B29C 48/22* (2019.01)
  *B32B 7/12* (2006.01)
  *B32B 27/08* (2006.01)
  *B32B 27/32* (2006.01)
  *B32B 33/00* (2006.01)
  *B32B 37/12* (2006.01)
  *B32B 37/15* (2006.01)
  *B32B 37/24* (2006.01)
  *C09D 129/04* (2006.01)
  *C09D 177/06* (2006.01)
  *B29L 7/00* (2006.01)

(52) U.S. Cl.
  CPC ... *B32B 2307/7376* (2023.05); *B32B 2323/04* (2013.01); *B32B 2439/40* (2013.01)

(56) References Cited

U.S. PATENT DOCUMENTS

| | | |
|---|---|---|
| 7,794,848 B2 | 9/2010 | Breese |
| 8,709,611 B2 | 4/2014 | Haley |
| 8,722,164 B2 | 5/2014 | Bekele |
| 9,393,529 B2 | 7/2016 | Zhou |
| 9,631,063 B2 | 4/2017 | Leidolf |
| 10,150,275 B2 | 12/2018 | Shah |
| 10,357,940 B2 | 7/2019 | Mazzola |
| 10,821,703 B1 | 11/2020 | Dinh-Sybeldon |
| 11,135,820 B2 | 10/2021 | Gohr |
| 11,247,440 B2 | 2/2022 | Ambroise |
| 11,273,592 B2 | 3/2022 | Yun |
| 11,298,922 B2 | 4/2022 | Gilbert |
| 11,312,113 B2 | 4/2022 | Chen |
| 11,618,054 B2 | 4/2023 | Mongrain |
| 11,628,654 B2 | 4/2023 | Berbert |
| 11,718,075 B2 | 8/2023 | Jones |
| 11,952,188 B1 | 4/2024 | Farkas |
| 2009/0011263 A1 | 1/2009 | Forloni |
| 2011/0229701 A1 | 9/2011 | Rivett |
| 2011/0318589 A1 | 12/2011 | Pignatelli |
| 2013/0302894 A1* | 11/2013 | Bekele .............. B32B 27/08 428/483 |
| 2020/0108987 A1* | 4/2020 | De La Vega Sudan ............ B32B 27/32 |
| 2020/0122439 A1 | 4/2020 | Grefenstein |
| 2020/0223185 A1 | 7/2020 | Christensen |
| 2020/0391489 A1 | 12/2020 | Lamtigui |
| 2022/0355583 A1* | 11/2022 | Parvatareddy ........ B32B 27/306 |
| 2022/0355587 A1 | 11/2022 | Limatibul |
| 2023/0145052 A1 | 5/2023 | Zhan |
| 2023/0405981 A1 | 12/2023 | D'Alterio |
| 2024/0025161 A1 | 1/2024 | Lee |
| 2025/0115033 A1 | 4/2025 | Gillespie |

FOREIGN PATENT DOCUMENTS

| | | |
|---|---|---|
| EP | 3419825 B1 | 8/2020 |
| EP | 2874813 B1 | 9/2020 |
| EP | 2886329 B1 | 6/2021 |
| EP | 3849792 A1 | 7/2021 |
| EP | 3733408 B1 | 1/2022 |
| EP | 4019246 A1 | 6/2022 |
| EP | 3840951 B1 | 3/2023 |
| EP | 4392248 A1 | 7/2024 |
| FI | 117622 B | 12/2006 |
| GB | 2612905 A | 5/2023 |
| WO | 2005032815 A1 | 4/2005 |
| WO | 2018202479 A1 | 11/2018 |
| WO | 2019083675 | 5/2019 |
| WO | 2023113791 | 6/2023 |
| WO | 2024008639 A1 | 1/2024 |
| WO | 2024068314 A1 | 4/2024 |
| WO | 2025042808 A1 | 2/2025 |

* cited by examiner

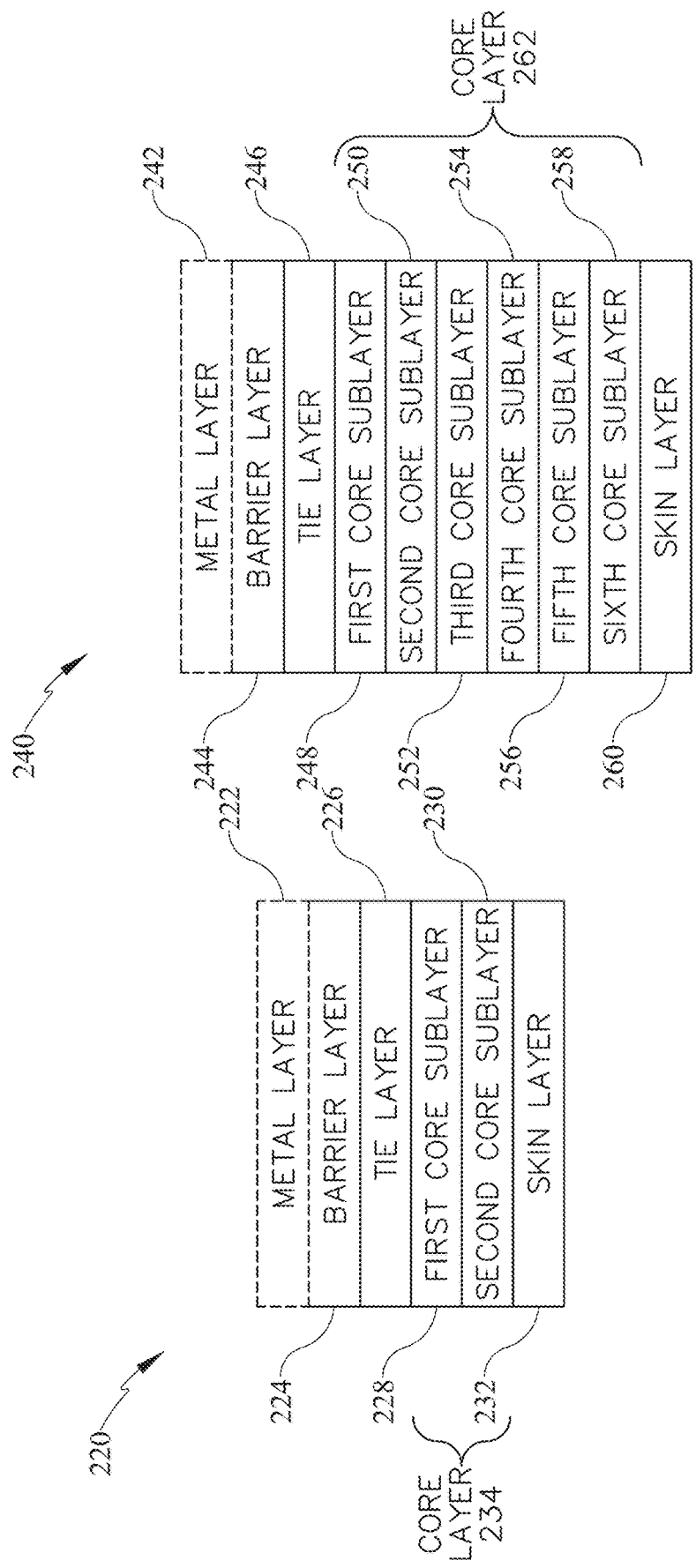

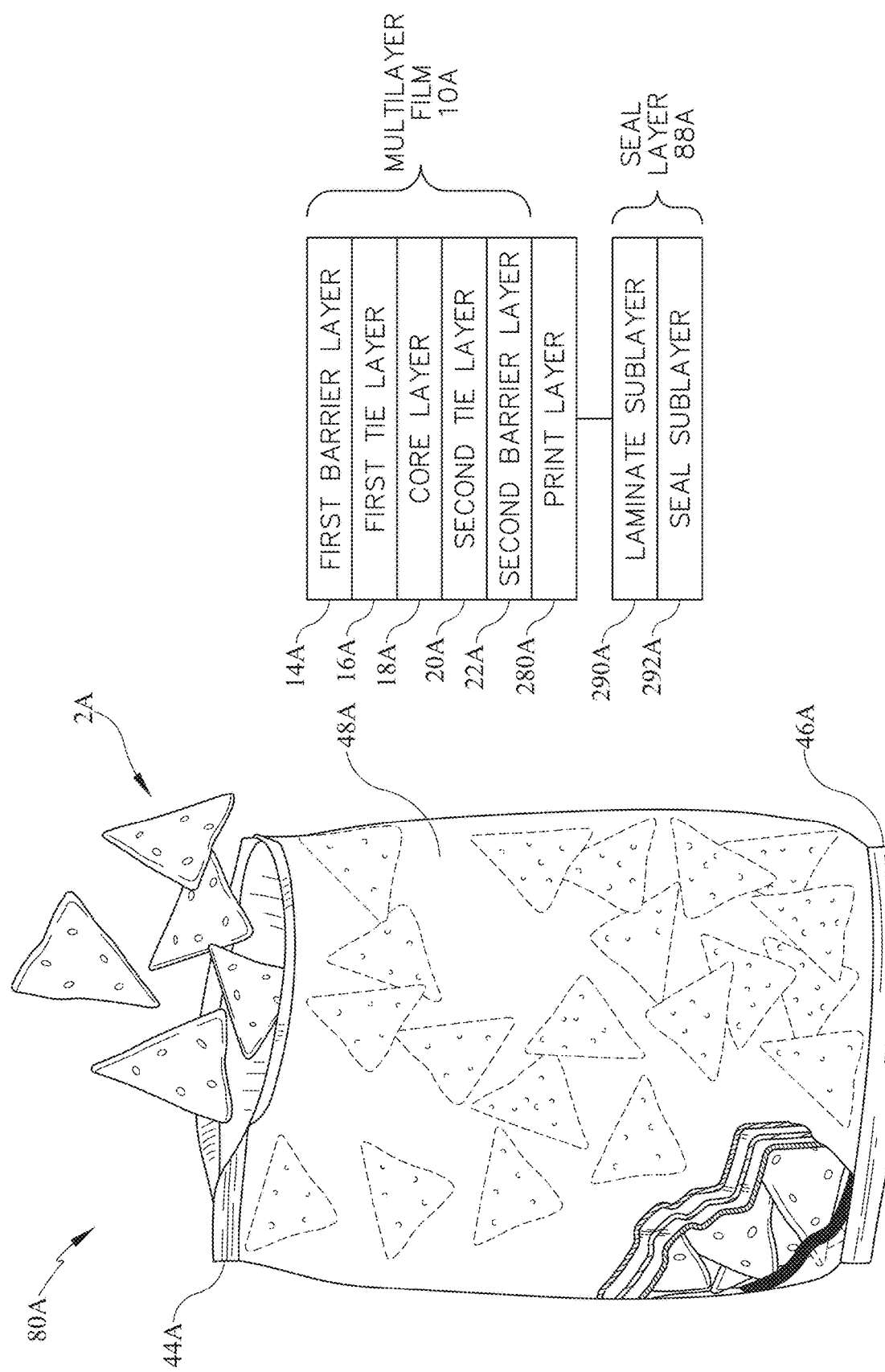

MACHINE-DIRECTION ORIENTED POLYMERIC FILM AND METHOD OF MAKING THE SAME

RELATED APPLICATIONS

This application claims priority under 35 U.S.C. § 119 (e) of U.S. Provisional Application No. 63/624,000, filed Jan. 23, 2024, the entire disclosure of which is incorporated herein by reference.

BACKGROUND

The present disclosure relates to films, and particularly to polymeric films. More particularly, the present disclosure relates to multilayered films formed from polymeric material.

SUMMARY

According to the present disclosure, a multilayer film is used to form a package formed to hold a product therein. In one illustrative embodiment, the present disclosure provides a multilayer film that includes a barrier layer. The multilayer film may include a barrier layer and a first layer. The multilayer film may include a tie layer arranged to extend between and interconnect the barrier layer and the first layer. In one illustrative embodiment, the first layer is a core layer. In another illustrative embodiment, the first layer is a skin layer. The barrier layer is arranged to form an outer surface of the multilayer film. In one embodiment, the barrier layer may include ethylene-vinyl alcohol copolymer (EVOH), or blends thereof. In another embodiment, the barrier layer may include a polyamide (nylon), or blends thereof. The core layer includes polyethylene (PE).

In one illustrative embodiment, the present disclosure provides a multilayer film that is a coated multilayer film. In some illustrative embodiments, the multilayer film is used to form a metallized multilayer film including a metal layer deposited on the outer surface of the multilayer film. The metal layer is arranged to directly contact the barrier layer of the multilayer film.

In illustrative embodiments, a film-manufacturing process provides a multilayer film. In another embodiment, a film-manufacturing process provides a coated multilayer film. In illustrative embodiments, the film-manufacturing process includes a metallizing operation in which a metal layer is applied to an outer surface of the multilayer film.

In one illustrative embodiment, the present disclosure provides a multilayer film that is a blocked multilayer film. In another illustrative embodiment, the present disclosure provides a multilayer film that is a non-blocked multilayer film. The first layer in a non-blocked multilayer film is a core layer, when present. The first layer in a non-blocked multilayer film is a core layer, when present, or a skin layer.

In illustrative embodiments, a blocked multilayer film is made in a blocked film-manufacturing process. The blocked film-manufacturing process includes an extruding operation in which molten plastics materials are extruded through a die to form a molten tubular film and a blowing operation in which the molten tubular film is blown to expand and establish a blown film. The blocked film-manufacturing process further orienting and stretching the blown film in a direction to provide a machine direction oriented film.

In illustrative embodiments, the blocked film-manufacturing process provides a blocked multilayer film. The blocked film-manufacturing process includes collapsing the blown film upon itself, such that a first interior surface of the blown film adheres to an adjacent second interior surface of the blown film thereby forming the blocked multilayer film.

In illustrative embodiments, a non-blocked multilayer film is made in a non-blocked film-manufacturing process. The non-blocked film-manufacturing process provides a non-blocked multilayer film.

In one illustrative embodiment, the present disclosure provides a laminate comprising the multilayer film as described herein and a second film. The laminate may include an adhesive arranged to extend between and interconnect the multilayer film and the second film. In illustrative embodiments, a laminate is used to form a package formed to hold a product therein.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a diagrammatic view of the blocked film-manufacturing process 100 showing that the process includes the operations of extruding molten plastic materials 110 to form a molten tubular film, blowing the molten tubular film 112 to establish a blown film, blocking the blown film 114 to form a blocked blown film, orienting and stretching the blocked blown film 116 to provide a machine direction oriented film, optionally slitting the blocked blown film 118, optionally coating the blocked blown film 120, optionally printing 122, optionally laminating 124, and packaging 126;

Figure 4:
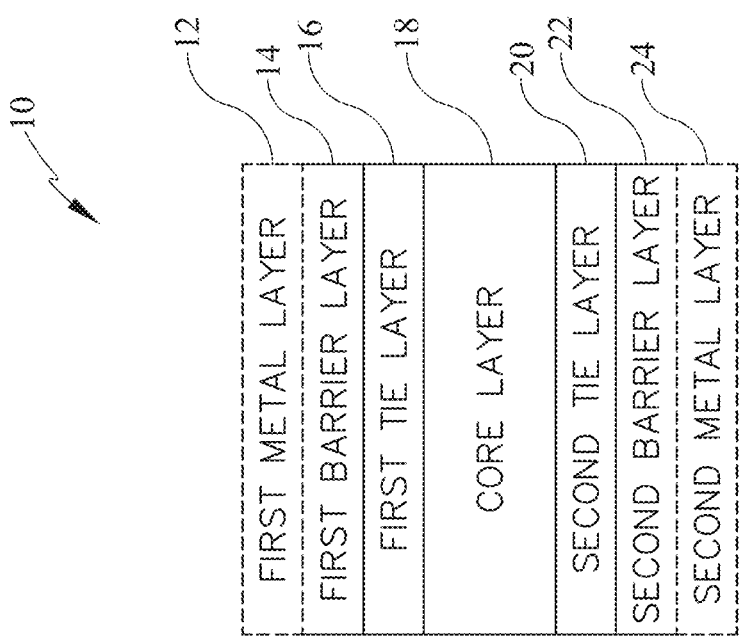
Figures 5, 6:
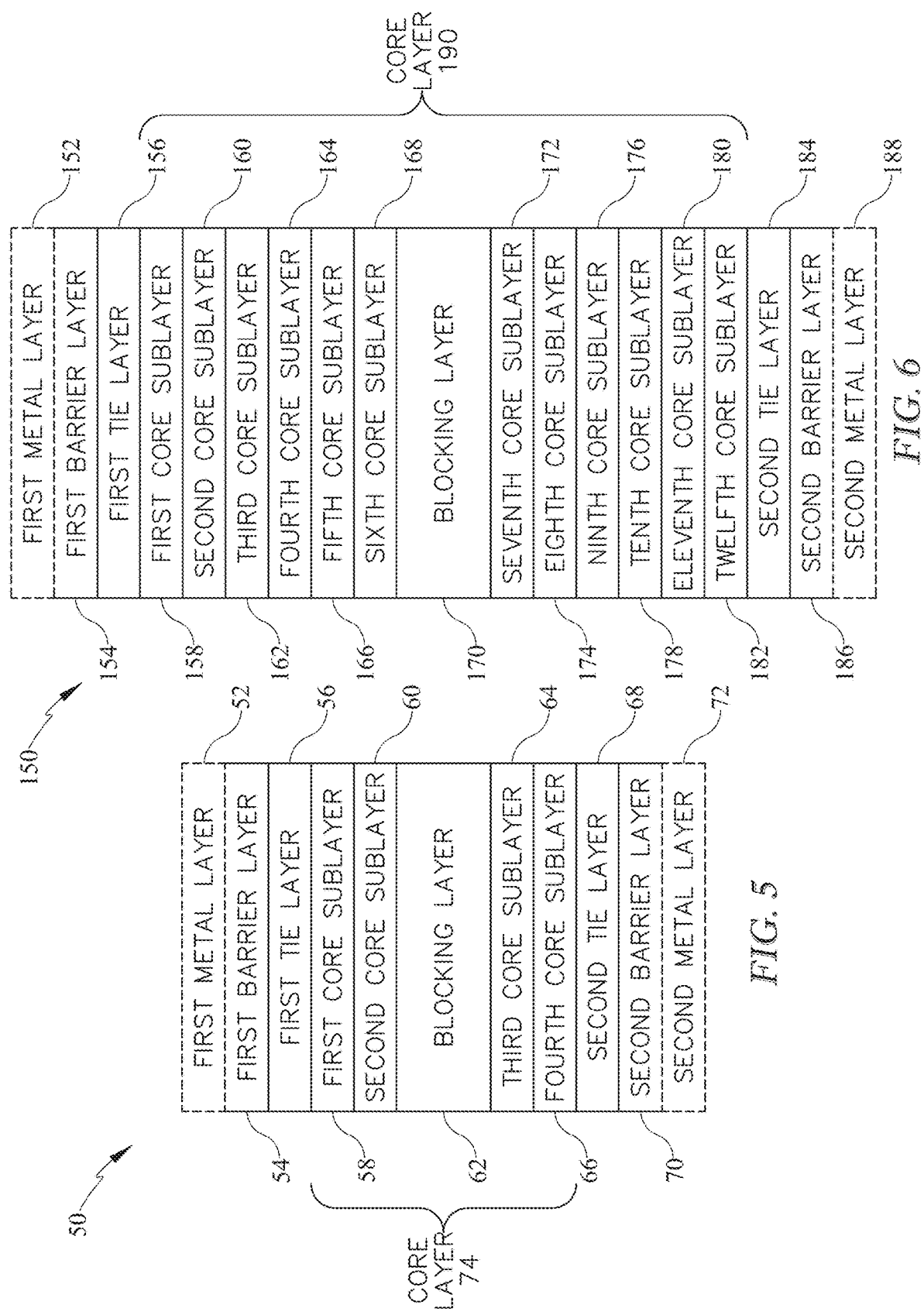
Figure 7:
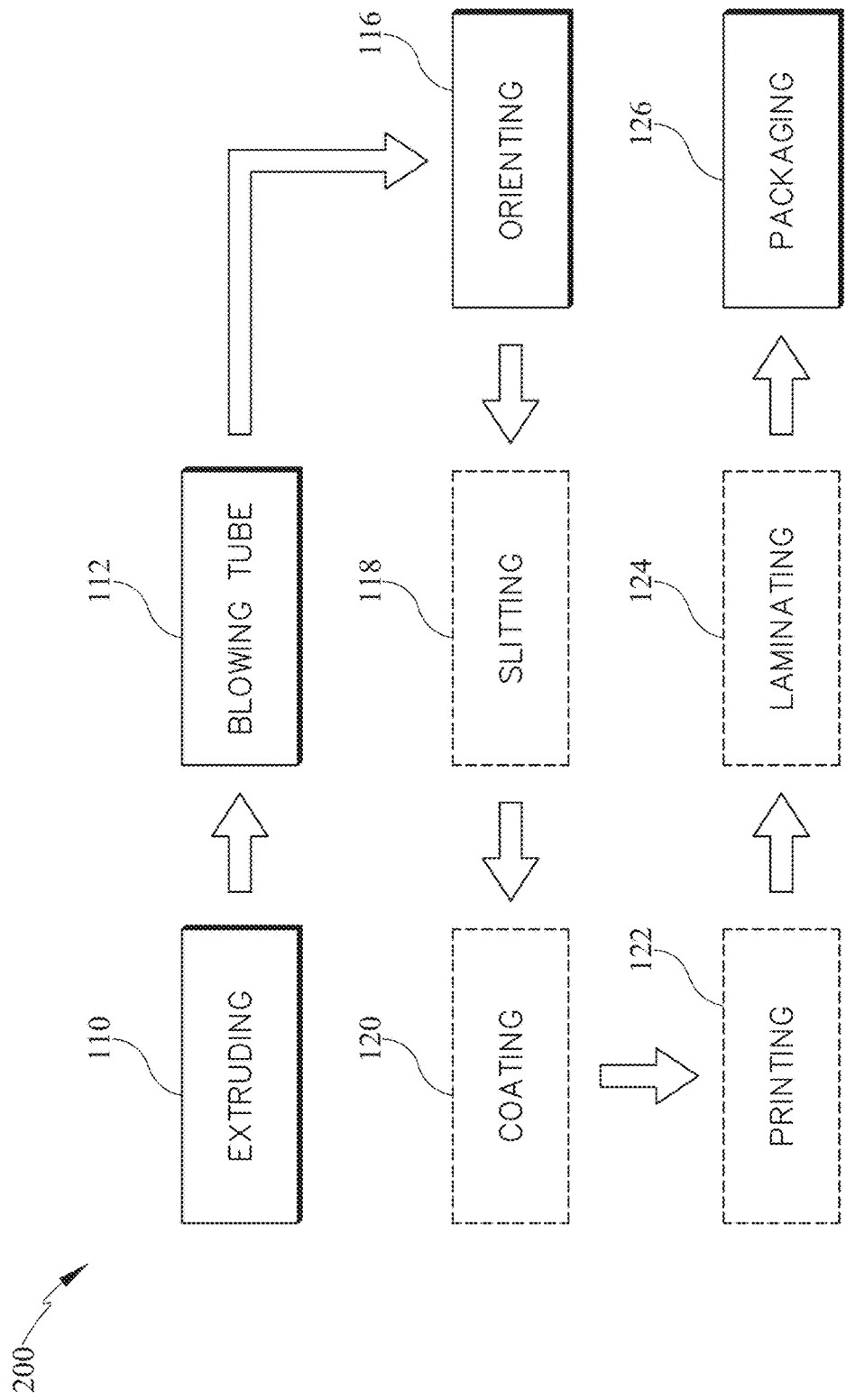
Figure 8:
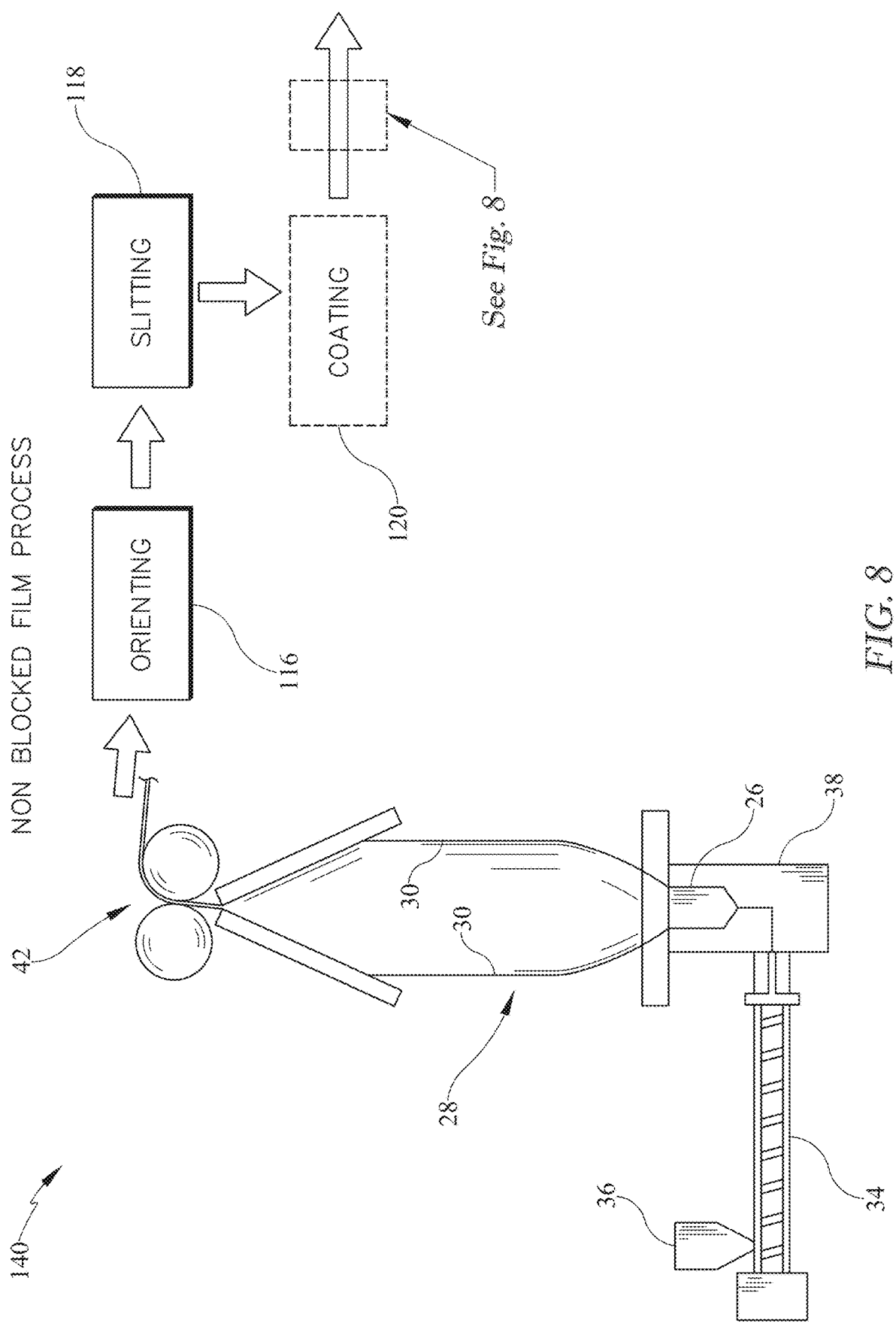
Figure 9:
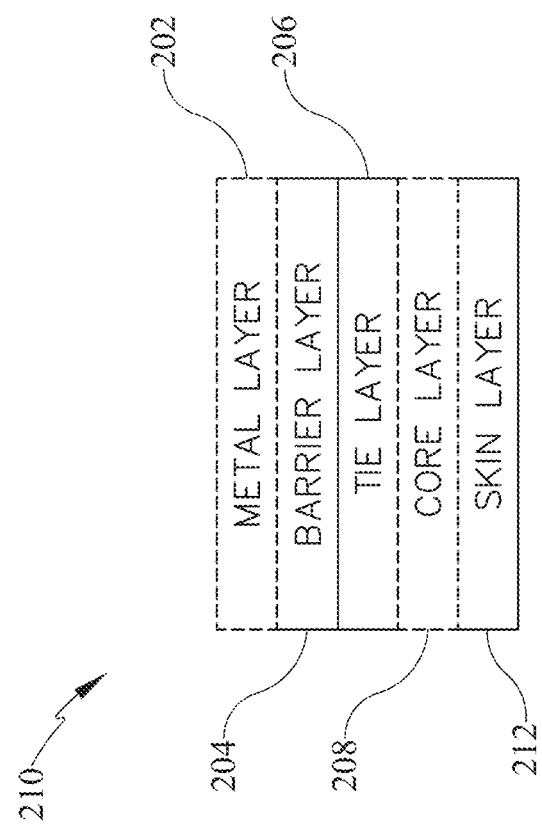
Figure 12:
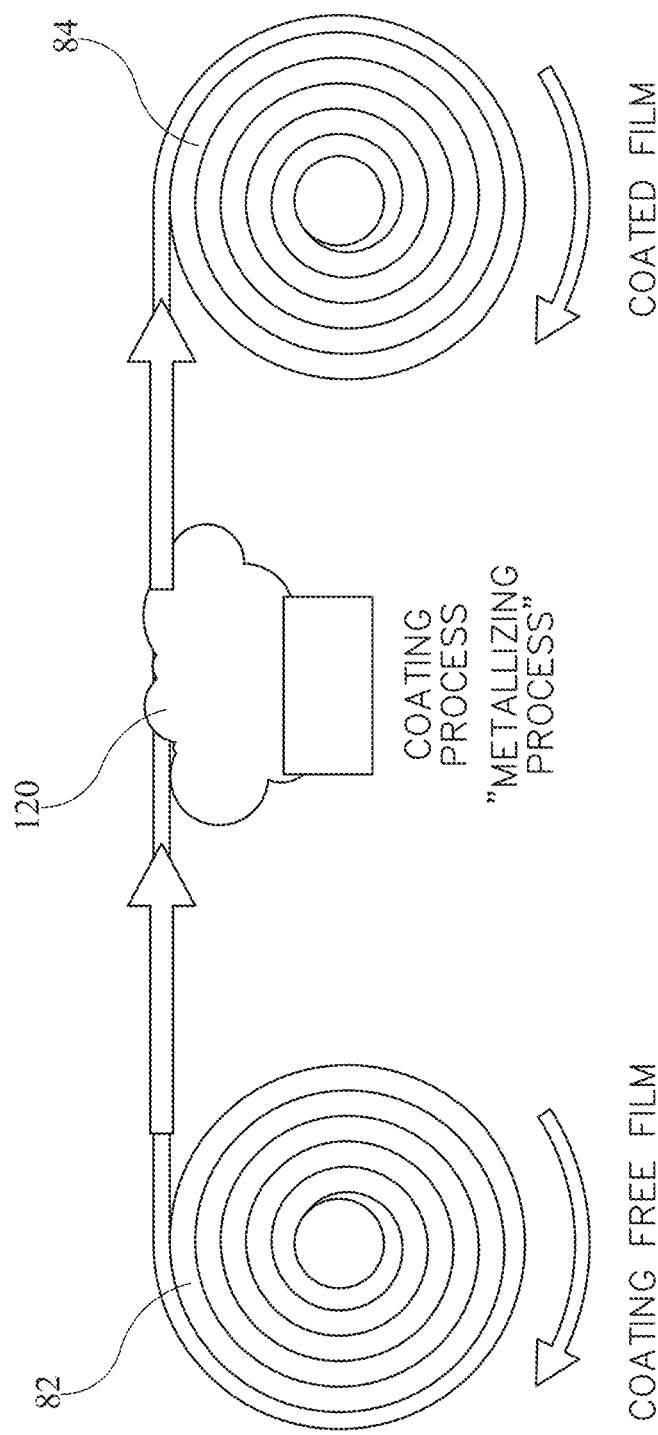
Figure 13:
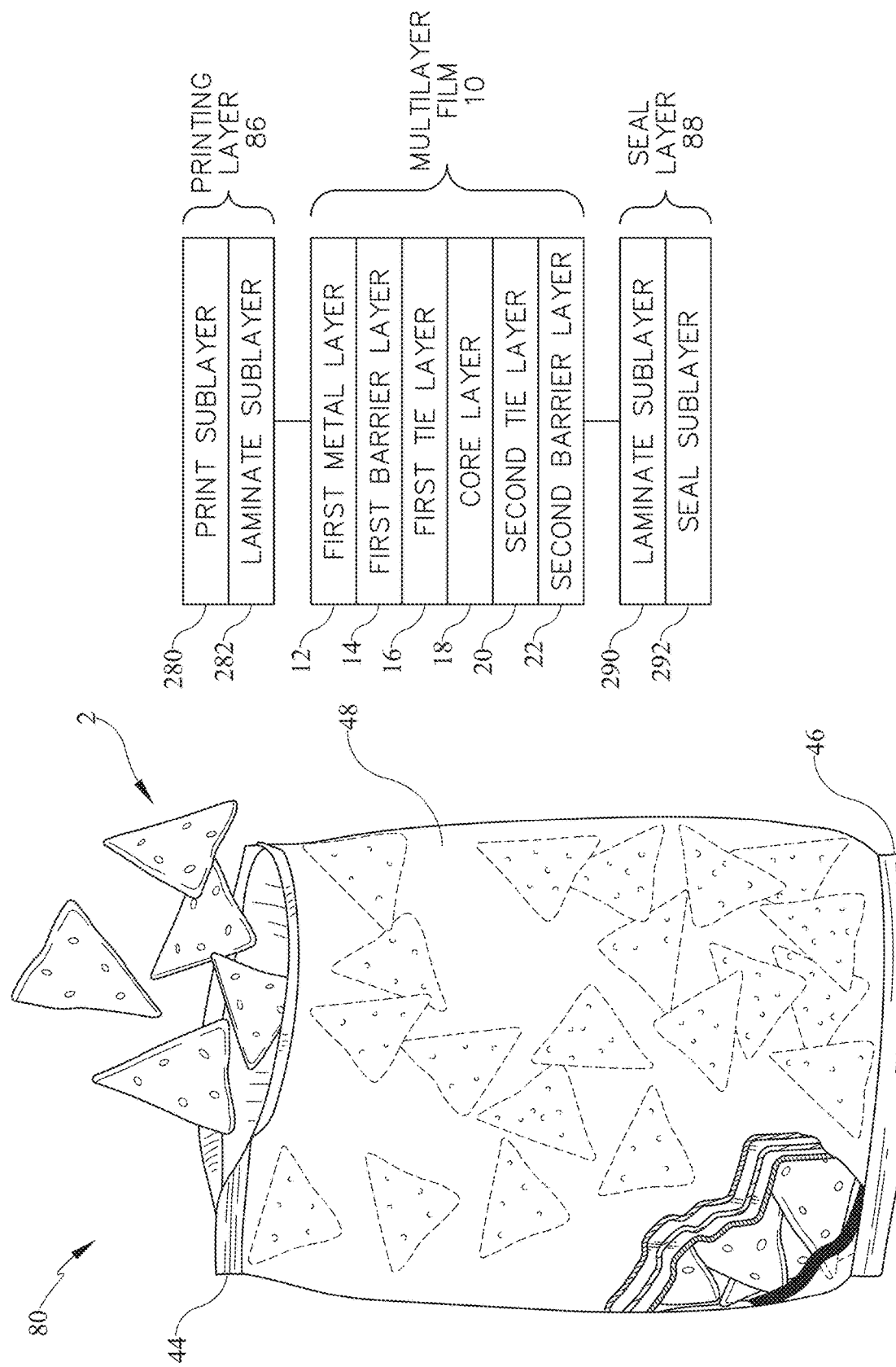
Figure 14:
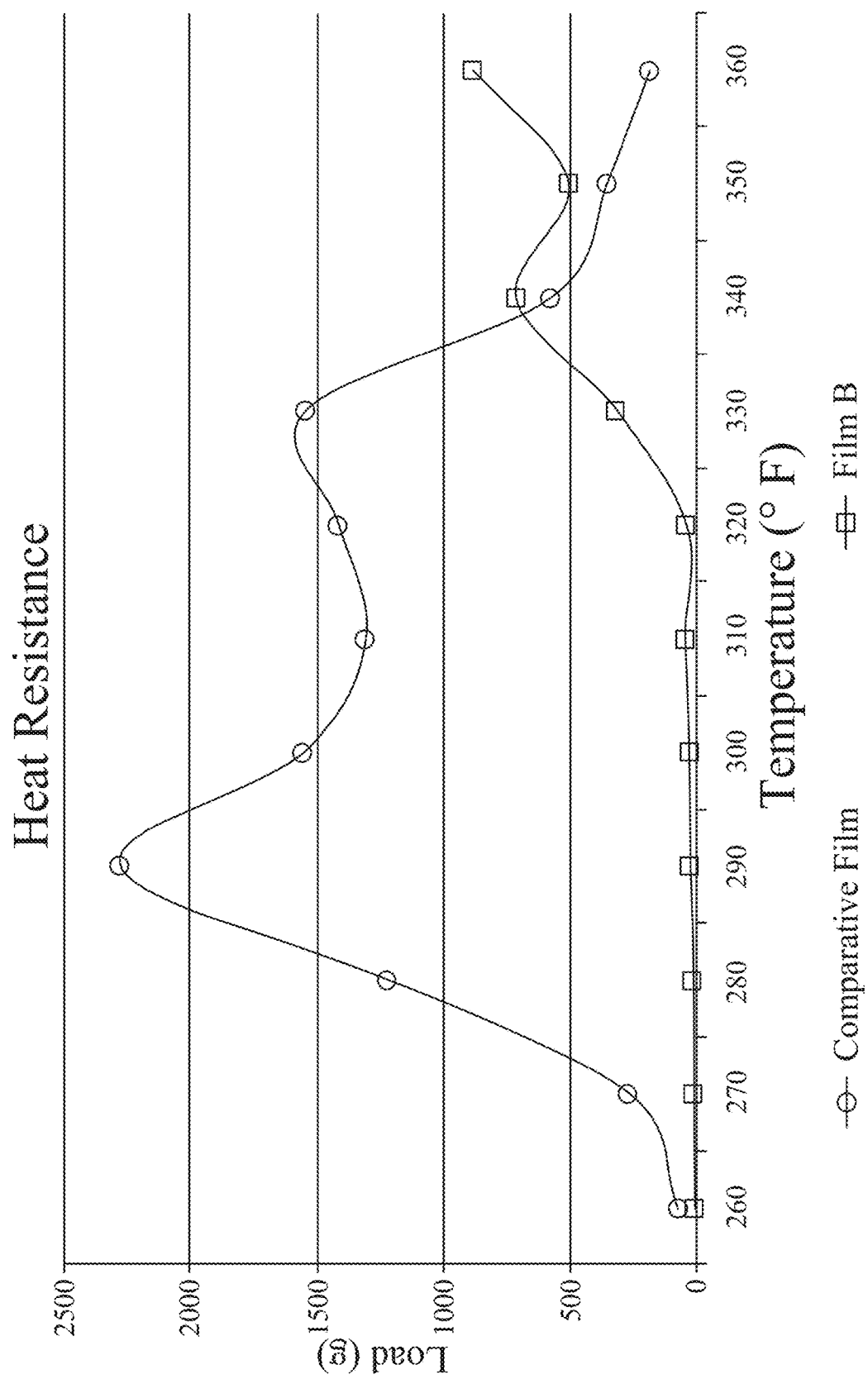

FIG. 4 is a diagrammatic view of an embodiment of a blocked multilayer film 10 in accordance with the present disclosure showing that the multilayer film includes, from top to bottom, an optional first metal layer 12, a first barrier layer 14, a first tie layer 16, a core layer 18, a second tie layer 20, a second barrier layer 22, and an optional second metal layer 24;

FIG. 5 is a diagrammatic view of an embodiment of a blocked multilayer film 50 in accordance with the present disclosure showing that the multilayer film includes, from top to bottom, an optional first metal layer 52, a first barrier layer 54, a first tie layer 56, a core layer 74 including first core sublayer 58, second core sublayer 60, blocking layer 62, third core sublayer 64, fourth core sublayer 66, a second tie layer 68, a second barrier layer 70, and an optional second metal layer 72;

FIG. 6 is a diagrammatic view of an embodiment of a blocked multilayer film 150 in accordance with the present disclosure showing that the multilayer film includes, from top to bottom, an optional first metal layer 152, a first barrier layer 154, a first tie layer 156, a core layer 190 including first core sublayer 158, second core sublayer 160, third core sublayer 162, fourth core sublayer 164, fifth core sublayer 166, sixth core sublayer 168, blocking layer 170, seventh core sublayer 172, eighth core sublayer 174, ninth core sublayer 176, tenth core sublayer 178, eleventh core sublayer 180, twelfth core sublayer 182, a second tie layer 184, a second barrier layer 186, and an optional second metal layer 188;

FIG. 7 is a diagrammatic view of the non-blocked film-manufacturing process 200 showing that the process includes the operations of extruding molten plastics materials 110 to form a molten tubular film, blowing the molten tubular film 112 to establish a blown film, orienting and stretching the blown film 116 to provide a machine direction oriented film, optionally slitting the blown film 118, optionally coating the blown film 120, optionally printing 122, optionally laminating 124, and packaging 126;

FIG. 8 is a diagrammatic view of an exemplary process for forming a non-blocked multilayer film via a non-blocked blown film extrusion process 140;

FIG. 9 is a diagrammatic view of an embodiment of a non-blocked multilayer film 210 in accordance with the present disclosure showing that the multilayer film includes, from top to bottom, an optional metal layer 202, a barrier layer 204, a tie layer 206, an optional core layer 208, and a skin layer 212;

FIG. 10 is a diagrammatic view of an embodiment of a non-blocked multilayer film 220 in accordance with the present disclosure showing that the multilayer film includes, from top to bottom, an optional metal layer 222, a barrier layer 224, a tie layer 226, a core layer 234 including first core sublayer 228 and second core sublayer 230, and a skin layer 232;

FIG. 11 is a diagrammatic view of an embodiment of a non-blocked multilayer film 240 in accordance with the present disclosure showing that the multilayer film includes, from top to bottom, an optional metal layer 242, a barrier layer 244, a tie layer 246, a core layer 262 including first core sublayer 248, second core sublayer 250, third core sublayer 252, fourth core sublayer 254, fifth core sublayer 256, sixth core sublayer 258, and a skin layer 260;

FIG. 12 is a diagrammatic view of an exemplary process for coating a coating-free multilayer film 82 with a coating, such as a metal, via a coating process 120, such as metallizing, to provide a coated multilayer film 84; and FIG. 13 is perspective view of a package 80 made from a multilayer film in accordance with the present disclosure showing that the package 80 includes a pouch 48 formed to include an interior product-storage region, a first closure 44 that has been partially unsealed to allow access into the interior product-storage region for filling the package with a product 2, and a sealed second closure 46, and further showing the package 80 includes, in order from outside to inside, a printing layer 86, an embodiment of a blocked multilayer film 10, and a seal layer 88;

FIG. 13A is perspective view of a package 80A made from a multilayer film in accordance with the present disclosure showing that the package 80A includes a pouch 48A formed to include an interior product-storage region, a first closure 44A that has been partially unsealed to allow access into the interior product-storage region for filling the package with a product 2A, and a sealed second closure 46A, and further showing the package 80 includes, in order from outside to inside, an embodiment of a blocked multilayer film 10A, a print layer 280A, and a seal layer 88A; and FIG. 14 is an exemplary diagram showing a comparison of the heat resistance property of Film B of the present disclosure and a comparative MDOPE film showing that Film B provides a 40-50° F. improvement in heat resistance.

DETAILED DESCRIPTION

A multilayer film produced in accordance with the present disclosure can be formed by a film-manufacturing process.

Figure 1:
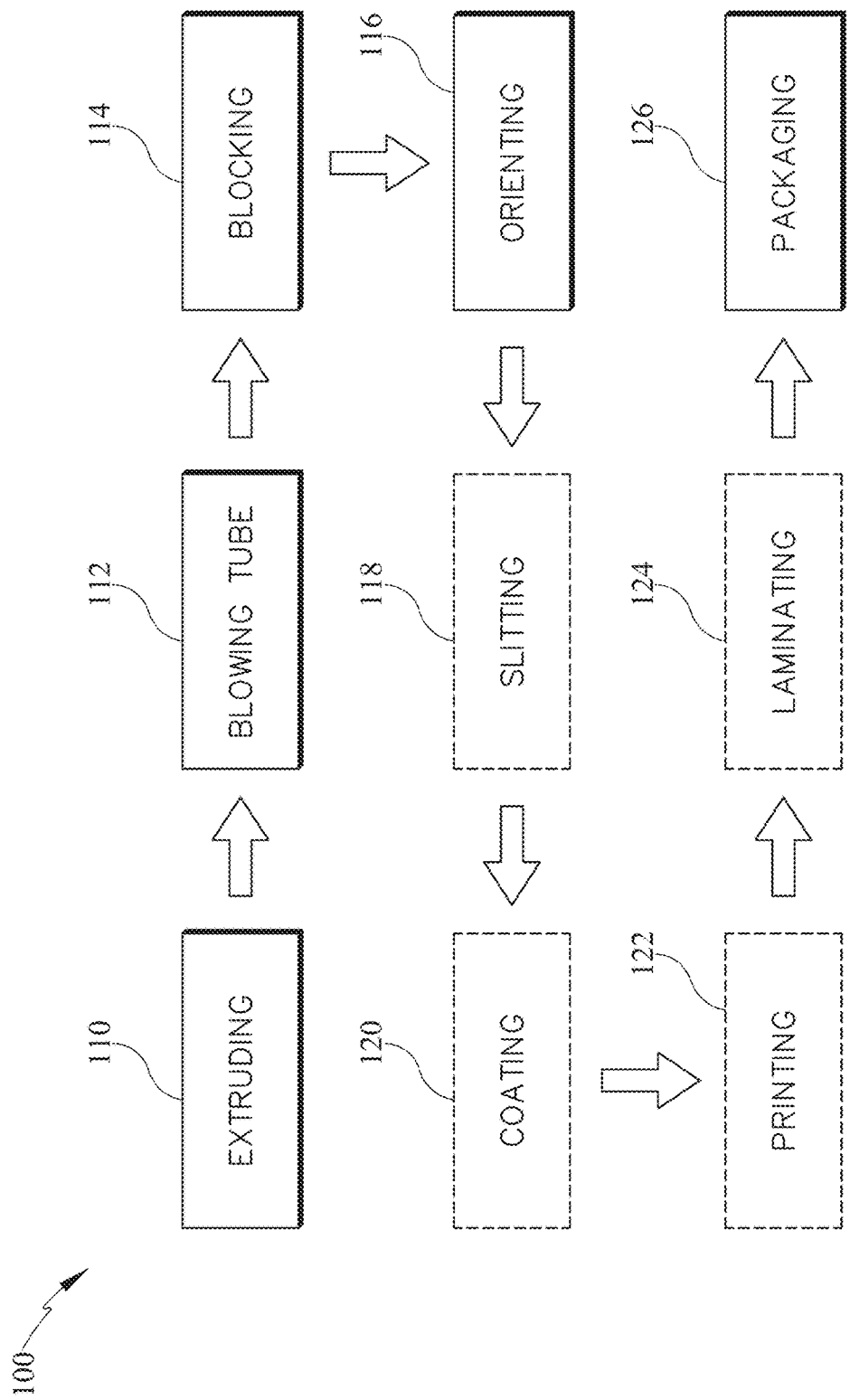

In one illustrative embodiment, a blocked film-manufacturing process 100 as shown in FIG. 1 provides a blocked multilayer film 10 as shown in FIG. 4. In another illustrative embodiment, a non-blocked film-manufacturing process 200 as shown in FIG. 7 provides a non-blocked multilayer film 210 as shown in FIG. 9. The blocked film-manufacturing process 100 and non-blocked film-manufacturing process 200 include an extruding process 112. Films as disclosed herein may be made by any suitable extrusion process 112, such as a blown film co-extrusion process or a cast film co-extrusion process. In some embodiments, the film-manufacturing processes disclosed herein include a blown film co-extrusion process.

In one illustrative embodiment, blocked multi-layer film 10, for example, is a co-extruded film in which a barrier layer 14, a core layer 18, and tie layer 16 each comprise a composition. Illustratively, each composition is formed by processing a formulation.

In another illustrative embodiment, non-blocked multilayer film 210, for example, is a co-extruded film in which barrier layer 204, core layer 208, skin layer 212, and tie layer 206 each comprise a composition. Illustratively, each composition is formed by processing a formulation.

Illustratively, each formulation of barrier layer, core layer, and tie layer may be added to a hopper 36, blended and heated in an extruder 34 to produce a molten material. In another illustrative embodiment, each formulation of barrier layer, tie layer, and skin layer may be independently added to a hopper 36, blended and heated in an extruder 34 to produce a molten material. Illustratively, the molten materials pass through a die 38 to form a molten extrudate. Illustratively, the film-manufacturing process includes a step of cooling the molten extrudate to form a film (e.g., a blown film or a cast film). In one example, molten materials can pass through a flat, or linear, die, thereby forming a cast film. In another example, molten materials can pass through an annular, or tubular, die to form a molten extrudate, for example molten tubular film 26, and subjected to a blowing operation, thereby forming a blown film. Illustratively, the film-manufacturing process includes blowing operation 112 of blowing the molten extrudate or molten tubular film 26 to establish a blown film 28. The film-manufacturing process includes an orienting operation 116 which orients and stretches the film (e.g., blown film 28 or a cast film) to orient in machine direction (MD), thereby establishing a machine direction oriented film. In some embodiments, the orienting operation 116 includes stretching the film (e.g., blown film 28 or a cast film) to orient in the machine direction. In another embodiment, the orienting operation 116 includes stretching the film (e.g., blown film 28 or a cast film) in the machine direction (MD) and the transverse direction (TD) (i.e., perpendicular to the MD, stretching in the transverse (cross) direction), thereby establishing a biaxially-oriented film.

Figure 2:
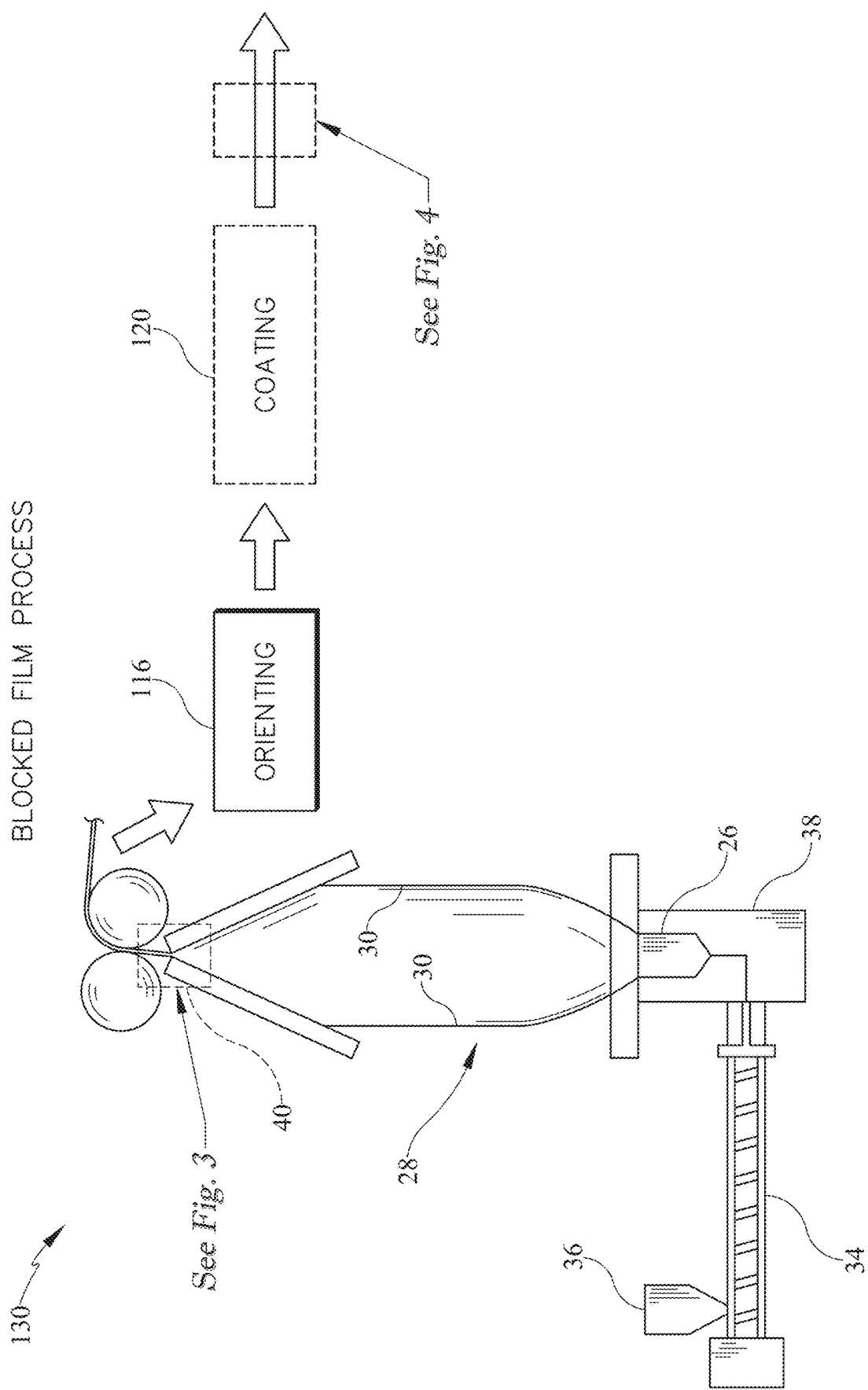
FIG. 2 is a diagrammatic view of an exemplary process for forming a blocked multilayer film via a blocked blown film extrusion process 130.
Figure 3:
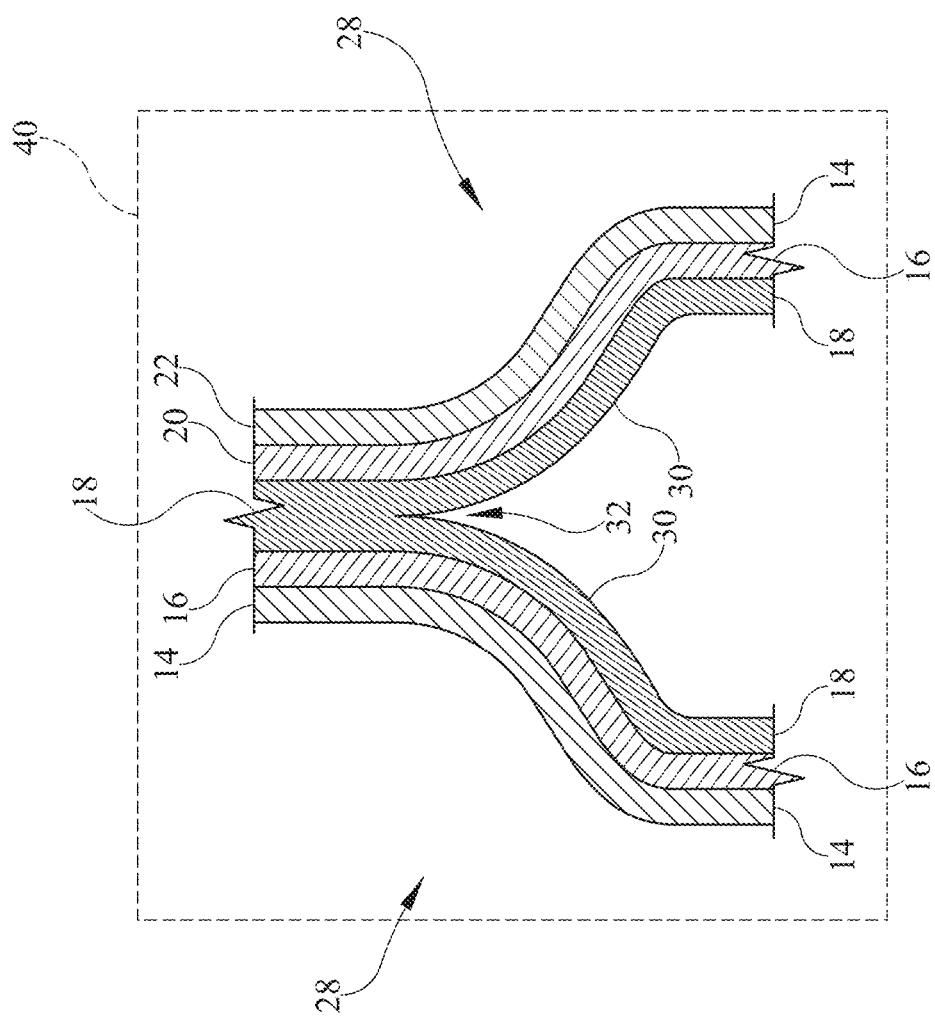
FIG. 3 is a diagrammatic view of a three-layered film bubble of a blown-film tube collapsing into a five-layered blocked multilayer film.

In one illustrative embodiment, blocked multilayer film 10 is formed using blocked film-manufacturing process 100 as shown illustratively in FIG. 1 and shown diagrammatically in FIG. 2 to provide a blocked multilayer film 10. In a film-manufacturing process 100 in accordance with the present disclosure, a three-layered bubble of blown film 28 may be collapsed upon itself 40 to form a lay-flat tube in which two adjacent central core layers 30, such as blocking layers, fuse together 32, thereby producing a five-layered blocked multilayer film structure 10, as shown illustratively in FIG. 3 and shown diagrammatically in FIG. 4. Similarly, in other embodiments, a five-layered bubble of blown film 28 may be collapsed upon itself to form a nine-layered blocked multilayer film 50, as shown in FIG. 5, a nine-layered film bubble of blown film 28 may be collapsed upon itself to form a seventeen-layered blocked multilayer film 150, as shown in FIG. 6, and so forth. However, any suitable number of layers may be used in multilayer films of the present disclosure.

In some illustrative embodiments, blown film 28 may comprise a composition. In some embodiments, blown film 28 may include any suitable number of co-extruded layers, such as 5 co-extruded layers, 7 co-extruded layers, and 9 co-extruded layers. In some embodiments, co-extruded layers may represent the composition of blown film 28 prior to any operation succeeding the blowing tube operation 112, such as a blocking operation 114. Blown film 28 may include a particular number of co-extruded layers. In one embodiment, blown film 28 includes 9 co-extruded layers. In another example, the blown film 28 may comprise 5 co-extruded layers. In another example, the blown film 28 may comprise 7 co-extruded layers. In another example, the blown film 28 may comprise any suitable number of total layers, or it can be advantageous to limit the number of total layers according to film manufacturing capabilities. The blown film 28 may comprise 5, 6, 7, 8, or 9 co-extruded layers, for example 9 co-extruded layers.

In one illustrative embodiment, blown film 28 proceeds to a blocking operation 114 in a blocked film-manufacturing process 100. During the blocking operation 114, blown film 28 may be collapsed upon itself to form a lay-flat tube in which two adjacent central core layers, such as blocking layers, fuse together, thereby producing a blocked multilayer film in accordance with the disclosure with a particular number of total layers. In some embodiments, a blown film 28 comprising 9 co-extruded layers forms a 17-layered blocked multilayer film. Similarly, a blown film 28 comprising 5 co-extruded layers forms a 9-layered blocked multilayer film, and a blown film 28 comprising 7 co-extruded layers forms a 13-layered blocked multilayer film. In another example, the blocked multilayer film may comprise any suitable number of total layers, or it can be advantageous to limit the number of total layers according to film manufacturing capabilities. The blocked multilayer film may comprise 9, 11, 13, 15, or 17 total layers. In some embodiments, the blocked multilayer film is provided by a blown film extrusion process.

In another illustrative embodiment, non-blocked multilayer film 210 is formed using non-blocked film-manufacturing process 200 as shown illustratively in FIG. 7 and shown diagrammatically in FIG. 8 to provide a non-blocked multilayer film 210. In a film-manufacturing process 200 in accordance with the present disclosure, a three-layered bubble of blown film 28 may be collapsed upon itself 42 to form a lay-flat tube in which two adjacent central skin layers, such as non-blocking layers, are in contact but do not fuse together. During slitting operation 118, blown film 28 is provided to a slitter where the film is slit and the layers of flattened blown film 28 separate, thereby producing a three-layered non-blocked multilayer film 210, as shown diagrammatically in FIG. 9. Similarly, in other embodiments, a five-layered film bubble may be collapsed upon itself, slit, and separated to form a five-layered non-blocked multilayer film 220, as shown in FIG. 10, a nine-layered film bubble may be collapsed upon itself, slit, and separated to form a nine-layered non-blocked multilayer film 240, as shown in FIG. 11, and so forth.

In another illustrative embodiment, blown film 28 does not proceed to a blocking operation 114 in a non-blocked film-manufacturing process 200. In some embodiments, the non-blocked film-manufacturing process 200 produces a non-blocked multilayer film in accordance with the disclosure with a particular number of total layers. In some embodiments, a blown film 28 comprising 9 co-extruded layers forms a 9-layered non-blocked multilayer film. Similarly, a blown film 28 comprising 5 co-extruded layers forms a 5-layered non-blocked multilayer film, and a blown film 28 comprising 7 co-extruded layers forms a 7-layered non-blocked multilayer film. In another example, the non-blocked multilayer film may comprise any suitable number of total layers. The non-blocked multilayer film may comprise 5, 6, 7, 8, or 9 total layers. In some embodiments, the non-blocked multilayer film is provided by a blown film extrusion process or a cast film extrusion process.

In another illustrative embodiment, a film-manufacturing process in accordance with the present disclosure, for example, the blocked film-manufacturing process 100 or the non-blocked film-manufacturing process 200, may comprise any suitable number of slitting operations 118 at any suitable stage of the film-manufacturing process. The slitting operation 118 may include, for example, trimming the edges of the flattened blown film 28, or trimming the edges of the multilayer film, such as blocked multilayer film or non-blocked multilayer film of the present disclosure, to provide a fixed width.

In one illustrative embodiment, the present disclosure provides a multilayer film that is a coated multilayer film. In one illustrative embodiment, the present disclosure provides a multilayer film that is a metallized multilayer film. In some illustrative embodiments, the multilayer film of the present disclosure is used to form a coated multilayer film, such as a metallized multilayer film, including a coating, such as a metal layer, deposited on the outer surface of the multilayer film. In some illustrative embodiments, the multilayer film of the present disclosure is used to form a coated or "metallized" multilayer film including a coating, such as a metal layer, deposited on the outer surface of the multilayer film. The coating, such as a metal layer, is arranged to directly contact a barrier layer of the multilayer film. In some embodiments, the coating, such as a metal layer, is arranged to directly contact the barrier layer comprising EVOH copolymer. In some embodiments, the coating, such as a metal layer, is arranged to directly contact the barrier layer comprising a polar polymer resin, such as EVOH or polyamide (nylon).

In illustrative embodiments, a coated or "metallized" multilayer film in accordance with the present disclosure can be formed by a film-manufacturing process. In some illustrative embodiments, a film-manufacturing process includes the step of coating 120, as shown in FIG. 1 and FIG. 7. The film-manufacturing process includes a coating operation 120 including depositing a coating, such as a metal layer, on the outer surface of a coating-free multilayer film 82 to provide a coated or "metallized" multilayer film 84, as shown in FIG. 12. In some illustrative embodiments, the coating, such as a metal layer, provided by the coating operation 120 is arranged to directly contact a barrier layer of the multilayer film.

In one illustrative embodiment, the coating-free multilayer film 82 is a blocked multilayer film of the present disclosure, which does not include a first metal layer or a second metal layer. In one illustrative embodiment, the coated or "metallized" multilayer film 84, for example, includes a blocked multilayer film including a first metal layer deposited on a first barrier layer. In another illustrative embodiment, the coated or "metallized" multilayer film 84 includes a blocked multilayer film with a first metal layer deposited on a first barrier layer and a second metal layer deposited on a second barrier layer.

In another illustrative embodiment, the coating-free multilayer film 82 is non-blocked multilayer film of the present disclosure, which does not include metal layer. In one illustrative embodiment, the coated or "metallized" multilayer film 84, for example, includes a non-blocked multilayer film with a metal layer deposited on a barrier layer.

In another illustrative embodiment, a film-manufacturing process 100 in accordance with the present disclosure or a film-manufacturing process 200 in accordance with the present disclosure may comprise any suitable processing operation, such as coating 120, printing 122, laminating 124, and the like. In some embodiments, any processing operation may take place in any suitable order or simultaneously when suitable. In some embodiments, the printing operation 122 and the laminating operation 124 may take place in any order or simultaneously.

The printing operation 122, for example, may include any suitable printing process. Non-limiting printing processes include reverse printing, surface printing, and the like. In some illustrative embodiments, a printing layer is arranged to be in direct contact with the multilayer film as described herein. In one illustrative embodiment, a printing layer (print layer) is arranged to be in direct contact with a barrier layer of the multilayer film. In another illustrative embodiment, a printing layer (print layer) is arranged to be in direct contact with a skin layer of the multilayer film. In another illustrative embodiment, a printing layer is arranged to be in direct contact with a metal layer.

In some illustrative embodiments, the printing layer may be another film (e.g., a print film) which has been printed thereon and adhered to the multilayer film as described herein by any suitable process, such as extrusion lamination, adhesive lamination, or any other suitable lamination process. In some illustrative embodiments, a printing layer includes a print sublayer and an optional laminating sublayer, such as an adhesive layer. In some other illustrative embodiments, a printing layer can be provided by coating the printing layer directly onto the barrier layer of the multilayer film as described herein, such that no lamination process or adhesive is used.

In some illustrative embodiments, a sealing layer is arranged to be in direct contact with the multilayer film as described herein. In one illustrative embodiment, a seal layer is arranged to be in direct contact with a barrier layer of the multilayer film. In another illustrative embodiment, a seal layer is arranged to be in direct contact with a skin layer of the multilayer film. In another illustrative embodiment, a seal layer is arranged to be in direct contact with a printing layer. In another illustrative embodiment, a seal layer is arranged to be in direct contact with a coating, such as a metal layer.

In some illustrative embodiments, the seal layer may adhered to the multilayer film as described herein by any suitable process, such as extrusion lamination, adhesive lamination, or any other suitable lamination process. In some illustrative embodiments, a seal layer includes a seal sublayer and an optional laminating sublayer, such as an adhesive layer. In some other illustrative embodiments, a seal layer, such as a cold seal coating or heat sealable material, can be provided by coating the seal layer directly onto the barrier layer of the multilayer film as described herein, such that no lamination process or adhesive is used. In some illustrative embodiments, the seal layer may be another film (e.g., a sealable film) adhered to the multilayer film as described herein by any suitable process, such as extrusion lamination, adhesive lamination, or any other suitable lamination process.

The laminating operation 124, may include incorporating any suitable layer onto the multilayer film by lamination. In one illustrative embodiment, the laminating operation 124 may include attaching a printing layer 86 onto the multilayer film as described herein. The printing layer 86 may include a print sublayer 280 and an optional laminating sublayer 282, such as an adhesive layer. In some embodiments, the laminating sublayer 282 is arranged to extend between and interconnect the print sublayer 280 and the multilayer film. In some embodiments, the laminating sublayer 282, such as an adhesive layer, is arranged to extend between and interconnect the print sublayer 280 and a barrier layer of the multilayer film. In some embodiments, the laminating sublayer 282, such as an adhesive layer, is arranged to extend between and interconnect the print sublayer 280 and a skin layer of the multilayer film. In some embodiments, the laminating sublayer 282, such as an adhesive layer, is arranged to extend between and interconnect the print sublayer 280 and metal layer. In some embodiments, the laminating sublayer 282 is an adhesive layer.

In another illustrative embodiment, the laminating operation 124 may include attaching a seal layer 88 onto the multilayer film as described herein. The seal layer 88 may include a seal sublayer 292 and an optional laminating sublayer 290, such as an adhesive layer. In some embodiments, the laminating sublayer 290, such as an adhesive layer, is arranged to extend between and interconnect the seal sublayer 292 and the multilayer film. In some embodiments, the laminating sublayer 290, such as an adhesive layer, is arranged to extend between and interconnect the seal sublayer 292 and a barrier layer of the multilayer film. In some embodiments, the laminating sublayer 290, such as an adhesive layer, is arranged to extend between and interconnect the seal sublayer 292 and a skin layer of the multilayer film. In some embodiments, the laminating sublayer 290, such as an adhesive layer, is arranged to extend between and interconnect the seal sublayer 292 and metal layer. In some embodiments, the laminating sublayer 290 is an adhesive layer.

In another illustrative embodiment, the laminating operation 124 may include attaching a seal layer, onto a multilayer film as described herein, or onto a printing layer of a multilayer film as described herein. In another illustrative embodiment, the laminating operation 124 may include attaching a second multilayer film according to the present disclosure onto a first multilayer film as described herein, onto a printing layer of a first multilayer film as described herein, or a seal layer of a first multilayer film as described herein.

In another illustrative embodiment, a film-manufacturing process 100 in accordance with the present disclosure or a film-manufacturing process 200 in accordance with the present disclosure provides a laminate including a multilayer film according to the present disclosure, at least one of a second film, and optionally an adhesive extending between and interconnecting the multilayer film and the at least one second film. The laminate may be provided by any suitable process, such as extrusion lamination, adhesive lamination, or any other suitable lamination process. The multilayer film, for example, may include a print layer (e.g., a surface printed layer or a reverse printed layer, and an optional adhesive), a metal layer, or a combination thereof. The second film, for example, may be a sealable film (e.g., a cold seal coating, a sealable polyethylene film, or a barrier sealable polyethylene film), a second multilayer film according to the present disclosure, or a combination thereof.

In some embodiments, the laminate may include any suitable number of films in any suitable arrangement of films. In some embodiments, the laminate includes 2, 3, or 4 films, with an optional adhesive extending between and interconnecting each of the films. In one example, the laminate includes the multilayer film of the present disclosure (e.g., multilayer film 10), a sealable film (e.g., seal sublayer 292), and optionally an adhesive (e.g., laminate sublayer 290) extending between and interconnecting the multilayer film and the sealable film. In one example, the laminate includes the multilayer film of the present disclosure, a print film (e.g., print sublayer 280), and optionally an adhesive (e.g., laminate sublayer 282) extending between and interconnecting the multilayer film and the print film.

An exemplary configuration for a laminate in accordance with the present disclosure includes, but is not limited to the following representative structure: print film/optional adhesive/multilayer film/optional adhesive/sealable film. In one example, the laminate includes a print film, the multilayer film of the present disclosure, a sealable film, optionally a first adhesive extending between and interconnecting the multilayer film and the print film, and optionally a second adhesive extending between and interconnecting the multilayer film and the sealable film. In one example, the multilayer film of the present disclosure (e.g., multilayer film 10), a sealable film (e.g., seal sublayer 292), a first adhesive (e.g., laminate sublayer 282) extending between and interconnecting the multilayer film and the print film, and a second adhesive (e.g., laminate sublayer 290) extending between and interconnecting the multilayer film and the sealable film, as shown in FIG. 13.

Another exemplary configuration for a laminate in accordance with the present disclosure includes, but is not limited to the following representative structure: multilayer film/optional adhesive/print film/optional adhesive/sealable film. In another example, the laminate includes the multilayer film of the present disclosure, a print film, a sealable film, optionally a first adhesive extending between and interconnecting the multilayer film and the print film, and optionally a second adhesive extending between and interconnecting the print film and the sealable film. In one example, the laminate includes the multilayer film of the present disclosure (e.g., multilayer film 10A), a print film (e.g., print layer 280A), a sealable film (e.g., seal sublayer 292A), and an adhesive (e.g., laminate sublayer 290A) extending between and interconnecting the print film and the sealable film as shown in FIG. 13A.

Another exemplary configuration for a laminate in accordance with the present disclosure includes, but is not limited to the following representative structure: multilayer film/optional adhesive/multilayer film. In another example, the laminate includes a first multilayer film according to the present disclosure, a second multilayer film (e.g., a metallized multilayer film) according to the present disclosure, and optionally an adhesive extending between and interconnecting the first multilayer film and the second multilayer film.

Another exemplary configuration for a laminate in accordance with the present disclosure includes, but is not limited to the following representative structure: multilayer film/optional adhesive/multilayer film/optional adhesive/sealable film. In yet another example, the laminate includes a first multilayer film according to the present disclosure, a second multilayer film (e.g., a metallized multilayer film) according to the present disclosure, a sealable film, optionally a first adhesive extending between and interconnecting the first multilayer film and the second multilayer film, and optionally a second adhesive extending between and interconnecting the second multilayer film and the sealable film.

Another exemplary configuration for a laminate in accordance with the present disclosure includes, but is not limited to the following representative structure: multilayer film/optional adhesive/print film/optional adhesive/multilayer film/optional adhesive/sealable film. In yet another example, the laminate includes a first multilayer film according to the present disclosure, a print film, a second multilayer film (e.g., a metallized multilayer film) according to the present disclosure, a sealable film, optionally a first adhesive extending between and interconnecting the first multilayer film and the print film, optionally a second adhesive extending between and interconnecting the print film and the second multilayer film, and optionally a third adhesive extending between and interconnecting the second multilayer film and the sealable film.

In certain embodiments, a print layer, a seal layer, a print film, and a sealable film may each independently comprise a composition. Each of a print layer, a seal layer, a print film, and a sealable film may independently comprise, for example, a plastic polymer, a material, or a resin, and may optionally include one or more additives. Examples of plastic polymers, resins, or materials suitable for forming a print layer, a seal layer, a print film, and a sealable film include polyethylene, such as high density polyethylene (HDPE), medium density polyethylene (MDPE), linear medium-density polyethylene (LMDPE), low density polyethylene (LDPE), linear low-density polyethylene (LLDPE), and modified polyethylene, polypropylene, plastomer, and combinations thereof. Each of HDPE, MDPE, LMDPE, and LLDPE, for example, may be provided using Ziegler-Natta or metallocene catalysis. Illustratively, each composition is formed from a formulation that is processed in an extruder. Process additives including, but not limited to, slip agents, process aids, and anti-block agents may be added to the formulations to improve the extrusion process and provide additional properties to the multilayer film.

In one illustrative embodiment, the multilayer film according to the present disclosure of a laminate may be a particular thickness or fall within one of several different ranges. Multilayer film thickness of the laminate may fall within one of many different ranges. The thickness of the multilayer film of the laminate may be one of the following values: about 0.6 mils, about 0.7 mils, about 0.8 mils, about 0.9 mils, about 1.0 mils, about 1.1 mils, about 1.2 mils, about 1.3 mils, about 1.4 mils, about 1.5 mils, about 1.6 mils, about 1.7 mils, about 1.8 mils, about 1.9 mils, or about 2.0 mils. In a set of ranges, the multilayer film thickness of the laminate is one of the following ranges: less than about 2.5 mils, less than about 2 mils, less than about 1.6 mils, less than about 1.2 mils, less than about 1.1 mils, less than about 1.0 mils, about 0.35 mils to about 2.5 mils, about 0.35 mils to about 2 mils, about 0.35 mils to about 1.6 mils, about 0.35 mils to about 1.2 mils, about 0.35 mils to about 1.0 mils, 0.6 mils to about 2.5 mils, about 0.6 mils to about 2 mils, about 0.5 mils to about 1.6 mils, about 0.5 mils to about 1.2 mils, and about 0.5 mils to about 1.0 mils, about 0.6 mils to about 1.6 mils, about 0.6 mils to about 1.2 mils, and about 0.6 mils to about 1.0 mils.

In one illustrative embodiment, the laminate including a multilayer film according to the present disclosure may be a particular thickness or fall within one of several different ranges. Laminate thickness may fall within one of many different ranges. The thickness of laminate may be one of the following values: about 1.0 mils, about 1.5 mils, about 2.0 mils, about 2.5 mils, about 3.0 mils, about 3.5 mils, about 4.0 mils, about 4.5 mils, about 5.0 mils, about 5.5 mils, about 6.0 mils, about 6.5 mils, about 7.0 mils, about 7.5 mils, or about 8.0 mils. In a set of ranges, the thickness of laminate is one of the following ranges: less than about 8.0 mils, less than about 7.0 mils, less than about 6.0 mils, less than about 5.0 mils, less than about 4.0 mils, less than about 3.0 mils, less than about 2.0 mils, about 1 mil to about 8 mils, about 1 mil to about 7 mils, about 1 mil to about 6 mils, about 1 mil to about 5 mils, about 1 mil to about 4 mils, about 1 mil to about 3 mils, about 1 mil to about 2 mils, about 1.5 mil to about 8 mils, about 1.5 mil to about 7 mils, about 1.5 mil to about 6 mils, about 1.5 mil to about 5 mils, about 1.5 mil to about 4 mils, about 1.5 mil to about 3 mils, about 1.5 mil to about 2 mils, about 2 mils to about 8 mils, about 2 mils to about 7 mils, about 2 mils to about 6 mils, about 2 mils to about 5 mils, about 2 mils to about 4 mils, about 2 mils to about 3 mils, about 3 mils to about 8 mils, about 3 mils to about 7 mils, about 3 mils to about 6 mils, about 3 mils to about 5 mils, about 3 mils to about 4 mils, about 4 mils to about 8 mils, about 4 mils to about 7 mils, about 4 mils to about 6 mils, about 4 mils to about 5 mils, about 5 mils to about 8 mils, about 5 mils to about 7 mils, about 5 mils to about 6 mils, about 6 mils to about 8 mils, about 6 mils to about 7 mils, and about 7 mils to about 8 mils.

In some embodiments, a laminate of the present disclosure including the multilayer film as disclosed herein, can have a particular thickness suitable to the end-use application. For example, a laminate of the present disclosure used to form a package for holding large format products may have a thickness of about 5 mils to about 8 mils. Large format products, for example, may include high volume or heavier (e.g., 10 lbs or greater) products, such as bulk pet food products. Alternatively, a laminate of the present disclosure used to form a package for holding small format products may have a thickness of about 1 mil to about 5 mils. Small format products, for example, may include small volume or light weight (e.g., less than 10 lbs) products, such as snack food products or pet treat food products.

In some illustrative embodiments, package 80 can be formed in a packing operation 126. In some illustrative embodiments, multilayer film in accordance with the present disclosure may be used to form a package 80 for holding a product 2 as shown in FIG. 13. In some illustrative embodiments, a laminate including a multilayer film in accordance with the present disclosure may be used to form a package 80 for holding a product 2. Product 2 may include any suitable air-sensitive or moisture-sensitive products for packaging including, but not limited to, food products, industrial products, cosmetic products, paper products, electronic products, and the like. Package 80 includes pouch formed to include interior product-storage region 48, first closure 44 located at a first end of pouch 48, and second closure 46 located on an opposite second end of pouch 48 in spaced-apart relation to first closure. When filling pouch 48 with product 2 at a packing facility, second end may be sealed to form second closure 46 in order to retain product 2. After filling pouch with product 2, first end may be sealed to form first closure 44. In some embodiments, first closure 44 and second closure 46 are formed by a sealing process. The sealing process, for example, may include any suitable sealing process. Non-limiting sealing process include heat sealing, cold sealing, press sealing, and the like.

In one illustrative embodiment, package 80 may include the multilayer film as disclosed herein, an optional print layer 86, and an optional seal layer 88. In one illustrative embodiment, package 80 is includes blocked multilayer film 10, a print layer 86, and a seal layer 88, as shown in FIG. 13. In another illustrative embodiment, package 80A is includes blocked multilayer film 10A, a print layer 280A, and a seal layer 88A, as shown in FIG. 13A. In some embodiments, blocked multilayer film 10 includes a first metal layer 12, and the printing layer 86 is arranged to contact the first metal layer 12 of blocked multilayer film 10. In some embodiments, blocked multilayer film 10 does not include a first metal layer 12, and the printing layer 86 is arranged to contact the first barrier layer 14 of blocked multilayer film 10.

In some embodiments, a package of the present disclosure including the multilayer film as disclosed herein, can be used for holding a product in any number of suitable applications. Products may include any suitable air-sensitive or moisture-sensitive products, but not limited to, food products, industrial products, cosmetic products, paper products, electronic products, and the like. For example, the package of the present disclosure may be used in food product packaging, such as pet food packaging, snack food packaging, confectionary packaging, baked goods packaging, cookie/cracker/cereal packaging, baking mix packaging, or liquid packaging applications.

In one illustrative embodiment, multilayer film, such as blocked multilayer film or non-blocked multilayer film, formed by a film-manufacturing process is about 0.9 mils thick. Multilayer film, such as blocked multilayer film or non-blocked multilayer film, may be a particular thickness or fall within one of several different ranges. Multilayer film thickness may fall within one of many different ranges. The thickness of multilayer film, such as blocked multilayer film or non-blocked multilayer film, may be one of the following values: about 0.6 mils, about 0.7 mils, about 0.8 mils, about 0.9 mils, about 1.0 mils, about 1.1 mils, about 1.2 mils, about 1.4 mils, about 1.6 mils, about 1.8 mils, and about 2.0 mils. In a set of ranges, the thickness of multilayer film is one of the following ranges: less than about 2.5 mils, less than about 2 mils, less than about 1.6 mils, less than about 1.2 mils, less than about 1.1 mils, less than about 1.0 mils, about 0.35 mils to about 2.5 mils, about 0.35 mils to about 2 mils, about 0.35 mils to about 1.6 mils, about 0.35 mils to about 1.2 mils, about 0.35 mils to about 1.0 mils, about 0.6 mils to about 2.5 mils, about 0.6 mils to about 2 mils, about 0.5 mils to about 1.6 mils, about 0.5 mils to about 1.2 mils, and about 0.5 mils to about 1.0 mils, about 0.6 mils to about 1.6 mils, about 0.6 mils to about 1.2 mils, and about 0.6 mils to about 1.0 mils.

Multilayer Film Composition

In certain embodiments, each layer of multilayer film, such as blocked multilayer film or non-blocked multilayer film, may comprise a composition. Each layer may comprise, for example, a plastic polymer, a material, or a resin, and may optionally include one or more additives. Examples of plastic polymers, resins, or materials suitable for forming a multi-layer film include ethylene vinyl alcohol copolymer (EVOH), high density polyethylene (HDPE), medium density polyethylene (MDPE), linear medium-density polyethylene (LMDPE), low density polyethylene (LDPE), linear low-density polyethylene (LLDPE), modified LMDPE, modified polyethylene, polyolefin plastomer, and combinations thereof. In some embodiments, each layer of multilayer film may comprise EVOH, HDPE, MDPE, LMDPE, LDPE, LLDPE, plastomer, polyamide, polypropylene, or combinations thereof. Each of HDPE, MDPE, LMDPE, and LLDPE, for example, may be provided using Ziegler-Natta or metallocene catalysis. Illustratively, each composition is formed from a formulation that is processed in an extruder. Process additives including, but not limited to, slip agents, process aids, and anti-block agents may be added to the formulations to improve the extrusion process and provide additional properties to the multilayer film.

In some illustrative embodiments, multilayer film, such as blocked multilayer film or non-blocked multilayer film, may be free of one or more plastic polymers, resins, or materials to promote recyclability. In some illustrative embodiments, multilayer film, such as blocked multilayer film or non-blocked multilayer film, does not comprise or is free of polypropylene, polyamide, polystyrene, or polyester to promote recyclability. In some illustrative embodiments, multilayer film, such as blocked multilayer film or non-blocked multilayer film, does not comprise polypropylene. In some illustrative embodiments, multilayer film, such as blocked multilayer film or non-blocked multilayer film, does not comprise polypropylene or polyester. In some illustrative embodiments, multilayer film consists essentially of polyethylene. In some embodiments, multilayer film consists essentially of polyethylene polymer or copolymer. In another illustrative embodiment, multilayer film, such as blocked multilayer film or non-blocked multilayer film, does not comprise a compatibilizer.

In some embodiments, multilayer film, such as blocked multilayer film or non-blocked multilayer film, may include a particular amount of one or more plastic polymers, resins, or materials to promote recyclability. For example, multilayer film, such as blocked multilayer film or non-blocked multilayer film, may include EVOH, polyamide, or polypropylene in an amount of less than about 30%, less than about 20%, or less than about 10% by weight or volume of the multilayer film to promote recyclability. In some embodiments, multilayer film, such as blocked multilayer film or non-blocked multilayer film, may include a compatibilizer in an amount (wt or vol.) of up to about a 1 to 1 ratio with a polar polymer resin (e.g., EVOH or nylon). For example, multilayer film may include a compatibilizer in an amount of less than about 30%, less than about 20%, or less than about 10% by weight or volume of the multilayer film to promote recyclability. In some embodiments, the film may comprise REVIVE™ 311A compatibilizer available from Ampacet. In some embodiments, multilayer film may include an adhesive and/or ink (e.g., from a print layer) in an amount of less than about 30%, less than about 20%, or less than about 10% by weight or volume of the multilayer film to promote recyclability.

In certain embodiments, the multilayer film, such as blocked multilayer film or non-blocked multilayer film, may comprise a volume percentage or percent thickness of a particular plastic polymer, resin, or material, such as EVOH copolymer. In some embodiments, the multilayer film, such as blocked multilayer film or non-blocked multilayer film, comprises a volume percent of about 8% EVOH. In some embodiments, the multilayer film comprises a volume percent of about 12% EVOH. The volume percent of EVOH in the multilayer film may be one of several different percentages or fall within one of several different ranges. The volume percent of EVOH in the multilayer film may be one of the following values: about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, and about 26%, about 27%, about 28%, about 29%, and about 30%. It is within the present disclosure for the volume percent of EVOH in the multilayer film to fall within one of the following ranges: less than about 30%, less than about 25%, less than about 20%, less than about 15%, less than about 14%, less than about 13%, less than about 12%, less than about 11%, less than about 10%, about 3% to about 30%, about 3% to about 25%, about 3% to about 20%, about 3% to about 15%, about 3% to about 10%, about 3% to about 8%, about 5% to about 30%, about 5% to about 25%, about 5% to about 20%, about 5% to about 15%, about 5% to about 10%, about 5% to about 8%, about 10% to about 30%, about 10% to about 25%, about 10% to about 20%, and about 10% to about 15%.

In certain embodiments, the multilayer film, such as blocked multilayer film or non-blocked multilayer film, may comprise a volume percentage or percent thickness of a particular plastic polymer, resin, or material, such as polyamide (nylon). In some embodiments, the multilayer film, such as blocked multilayer film or non-blocked multilayer film, comprises a volume percent of about 15% nylon. The volume percent of nylon in the multilayer film may be one of several different percentages or fall within one of several different ranges. The volume percent of nylon in the multilayer film may be one of the following values: about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, and about 26%, about 27%, about 28%, about 29%, and about 30%. It is within the present disclosure for the volume percent of nylon in the multilayer film to fall within one of the following ranges: less than about 30%, less than about 25%, less than about 20%, less than about 15%, less than about 14%, less than about 13%, less than about 12%, less than about 11%, less than about 10%, about 5% to about 30%, about 5% to about 25%, about 5% to about 20%, about 5% to about 15%, about 5% to about 10%, about 5% to about 8%, about 10% to about 30%, about 10% to about 25%, about 10% to about 20%, and about 10% to about 15%.

Barrier Layer

In some embodiments, the barrier layer of the multilayer film, such as blocked multilayer film or non-blocked multilayer film, comprises, for example, a polyolefin polymer. In certain embodiments, the barrier layer of multilayer film is configured to form an outer surface, upon which an optional coating layer, e.g., metal layer, is deposited and configured to be in direct contact with the barrier layer.

In certain embodiments, the barrier layer of multilayer film is configured to form an outer surface, upon which any suitable layer or film is attached. For example, the barrier layer of the film may have one or more of a coating layer, a print layer, a seal layer, a print film, a sealable film, or a second multilayer film according to the present disclosure configured to be in contact, such as direct contact or through an interconnecting adhesive, with the barrier layer of multilayer film.

In some embodiments, the barrier layer may comprise a polyethylene polymer or copolymer. In some embodiments, the barrier layer of the multilayer film comprises, for example, a polar polymer resin, such as EVOH or polyamide (e.g., nylon). A polar polymer resin, for example, may include resins having melting points greater than about 160° C. (e.g., about 160° C. to about 220° C. or about 170° C. to about 200° C.). In some embodiments, a polar polymer resin includes EVOH, a polyamide (e.g., nylon), or a combination thereof.

In some embodiments, the barrier layer of the multilayer film comprises, for example, ethylene-vinyl alcohol copolymer (EVOH) or blends thereof. In some embodiments, the barrier layer of the multilayer film comprises, for example, ethylene-vinyl alcohol copolymer (EVOH) blended with any other suitable material in any suitable composition. In some embodiments, the barrier layer of the multilayer film comprises, for example, ethylene-vinyl alcohol copolymer (EVOH), ethylene-methyl acrylate copolymer (EMA), ethylene-vinyl acetate copolymer (EVA), thermoplastic polyurethane polymer (TPU), ethylene-maleic anhydride copolymer, or blends thereof. In some embodiments, the barrier layer comprises ethylene-vinyl alcohol copolymer (EVOH), such as EVOH with 32 mol %, 38 mol %, or 44 mol % ethylene content. In some embodiments, the barrier layer consists essentially of ethylene-vinyl alcohol copolymer (EVOH). In some embodiments, the barrier layer comprises SOARNOL™ DC3203RB (EVOH 32%) available from Soarus.

In some embodiments, the barrier layer may comprise a polyamide (nylon). In some embodiments, the barrier layer may comprise a polyamide polymer or copolymer. In some embodiments, the barrier layer of the multilayer film comprises, for example, nylon or blends thereof. In some embodiments, the barrier layer of the multilayer film comprises, for example, nylon blended with any other suitable material in any suitable composition. In some embodiments, the barrier layer comprises ULTRAMID® (PA 6 grade, PA 6/66 grade, or PA 66 grade) available from BASF.

In certain embodiments, the barrier layer may comprise a weight percentage of EVOH copolymer in a blend. In some embodiments, the barrier layer comprises a weight percent of about 100% of EVOH copolymer. The weight percent of EVOH copolymer in the barrier layer may be one of several different percentages or fall within one of several different ranges. The weight percent of the EVOH copolymer in the barrier layer may be one of the following values: about 60%, about 65%, about 70%, about 75%, about 80%, about 85%, about 90%, about 95%, about 98%, and about 100%. It is within the present disclosure for the weight percent of the EVOH copolymer to fall within one of the following ranges: greater than about 60%, greater than about 65%, greater than about 70%, greater than about 75%, greater than about 80%, greater than about 85%, greater than about 90%, greater than about 95%, greater than about 98%, about 60% to about 100%, about 60% to about 98%, about 60% to about 95%, about 60% to about 90%, about 70% to about 100%, about 70% to about 98%, about 70% to about 95%, about 70% to about 90%, about 80% to about 100%, about 80% to about 98%, about 80% to about 95%, and about 80% to about 90%.

In certain embodiments, the barrier layer may comprise a weight percentage of nylon in a blend. In some embodiments, the barrier layer comprises a weight percent of about 100% of nylon. The weight percent of nylon copolymer in the barrier layer may be one of several different percentages or fall within one of several different ranges. The weight percent of the nylon in the barrier layer may be one of the following values: about 60%, about 65%, about 70%, about 75%, about 80%, about 85%, about 90%, about 95%, about 98%, and about 100%. It is within the present disclosure for the weight percent of the nylon to fall within one of the following ranges: greater than about 60%, greater than about 65%, greater than about 70%, greater than about 75%, greater than about 80%, greater than about 85%, greater than about 90%, greater than about 95%, greater than about 98%, about 60% to about 100%, about 60% to about 98%, about 60% to about 95%, about 60% to about 90%, about 70% to about 100%, about 70% to about 98%, about 70% to about 95%, about 70% to about 90%, about 80% to about 100%, about 80% to about 98%, about 80% to about 95%, and about 80% to about 90%.

In certain embodiments, the barrier layer of multilayer film, such as blocked multilayer film or non-blocked multilayer film, may comprise a volume percentage or percent thickness of the multilayer film. In some embodiments, the barrier layer of the multilayer film, such as blocked multilayer film or non-blocked multilayer film, comprises a volume percent of about 8% of the multilayer film. In another embodiment, the barrier layer comprises a volume percent of about 12% of the multilayer film. The volume percent of the barrier layer may be one of several different percentages or fall within one of several different ranges. The volume percent of the barrier layer may be one of several different percentages or fall within one of several different ranges. The volume percent of the barrier layer may be one of the following values: about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, and about 26%, about 27%, about 28%, about 29%, and about 30%. It is within the present disclosure for the volume percent of the barrier layer to fall within one of the following ranges: less than about 30%, less than about 25%, less than about 20%, less than about 15%, less than about 14%, less than about 13%, less than about 12%, less than about 11%, less than about 10%, less than about 9%, less than about 8%, about 3% to about 20%, about 3% to about 15%, about 3% to about 12%, about 3% to about 10%, about 3% to about 8%, about 5% to about 30%, about 5% to about 25%, about 5% to about 20%, about 5% to about 15%, about 5% to about 10%, and about 5% to about 8%, about 10% to about 30%, about 10% to about 25%, about 10% to about 20%, and about 10% to about 15%.

In some embodiments, blocked multilayer film comprises two barrier layers, such as a first barrier layer and a second barrier layer. In some embodiments, the first barrier layer and the second barrier layer have the same composition. In some embodiments, each barrier layer of multilayer film is configured to form an outer surface, upon which any suitable layer or film is attached. For example, each barrier layer of the film may independently have one or more of a coating layer, a print layer, a seal layer, a print film, a sealable film, or a second multilayer film according to the present disclosure configured to be in contact, such as direct contact or through an interconnecting adhesive, with the barrier layer.

In some embodiments, each barrier layer (e.g. first barrier layer, second barrier layer) of blocked multilayer film comprises a particular volume percent of the multilayer film. In some embodiments, each barrier layer of blocked multilayer film comprises a volume percent of about 4% of the multilayer film. In some embodiments, each barrier layer comprises a volume percent of about 6% of the blocked multilayer film. The volume percent of each barrier layer may be one of several different percentages or fall within one of several different ranges. The volume percent of each barrier layer may be one of the following values: about 2%, about 3%, about 4%, about 5%, about 6%, about 7%, about 8%, about 9%, about 10%, about 11%, about 12%, about 13%, about 14%, and about 15%. It is within the present disclosure for the volume percent of each barrier layer to fall within one of the following ranges: less than about 15%, less than about 12%, less than about 10%, less than about 9%, less than about 8%, about 2% to about 15%, about 2% to about 10%, about 2% to about 8%, about 2% to about 6%, about 2% to about 5%, about 3% to about 15%, about 3% to about 10%, about 3% to about 8%, about 3% to about 6%, and about 3% to about 5%.

In some embodiments, the barrier layer of blocked multilayer film comprises a cumulative volume percent of each barrier layer (e.g. first barrier layer, second barrier layer) present in the multilayer film. The barrier layer of a blocked multilayer film, for example, may include cumulative volume percent of about 8% in a multilayer film comprising a first barrier layer with a volume percent of about 4% and a second barrier layer with a volume percent of about 4%. In some embodiments, barrier layer of blocked multilayer film comprises a cumulative volume percent of about 8% of the multilayer film. In some embodiments, the barrier layer comprises a cumulative volume percent of about 12% of the multilayer film. The cumulative volume percent of the barrier layer may be one of several different percentages or fall within one of several different ranges. The cumulative volume percent of the barrier layer may be one of the following values: about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, and about 26%, about 27%, about 28%, about 29%, and about 30%. It is within the present disclosure for the cumulative volume percent of the barrier layer to fall within one of the following ranges: less than about 30%, less than about 25%, less than about 20%, less than about 15%, less than about 14%, less than about 13%, less than about 12%, less than about 11%, less than about 10%, less than about 9%, less than about 8%, about 3% to about 20%, about 3% to about 15%, about 3% to about 12%, about 3% to about 10%, about 3% to about 8%, about 5% to about 30%, about 5% to about 25%, about 5% to about 20%, about 5% to about 15%, about 5% to about 10%, and about 5% to about 8%, about 10% to about 30%, about 10% to about 25%, about 10% to about 20%, and about 10% to about 15%.

Core Layer

In some embodiments, the core layer of the multilayer film, such as blocked multilayer film or non-blocked multilayer film, comprises, a composition. For example, the core layer of the multilayer film, such as blocked multilayer film or non-blocked multilayer film, may comprise a polyolefin polymer. In some embodiments, the core layer may comprise a polyethylene polymer or copolymer. In some embodiments, the core layer may comprise low density polyethylene (LDPE), medium density polyethylene (MDPE), or high density polyethylene (HDPE). In some embodiments, the core layer comprises MDPE. The MDPE may be linear medium density polyethylene (LMDPE), metallocene MDPE, or metallocene LMDPE. The LDPE may be linear low density polyethylene (LLDPE) or metallocene LLDPE. In some embodiments, the core layer may comprise HDPE, MDPE, LMDPE, LDPE, LLDPE, or combinations thereof. Each of HDPE, MDPE, LMDPE, and LLDPE, for example, may be provided using Ziegler-Natta or metallocene catalysis. In some embodiments, the core layer comprises medium density polyethylene, ethylene-octene copolymer. In some embodiments, the core layer may comprise ELITE™ 5940G (mLMDPE-C8) resin available from Dow. In some embodiments, the core layer further comprises a compatibilizer.

In some embodiments, the core layer of the multilayer film, such as blocked multilayer film or non-blocked multilayer film, comprises a volume percent of about 82% of the multilayer film. In some embodiments, the core layer comprises a volume percent of about 78% of the multilayer film. The volume percent of the core layer may be one of several different percentages or fall within one of several different ranges. The volume percent of the core layer may be one of the following values: about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, and about 95%. It is within the present disclosure for the volume percent of the core layer to fall within one of the following ranges: greater than about 90%, greater than about 85%, greater than about 80%, greater than about 78%, greater than about 76%, greater than about 75%, greater than about 70%, greater than about 65%, greater than about 60%, greater than about 55%, greater than about 50%, about 50% to about 95%, about 50% to about 90%, about 50% to about 85%, about 60% to about 95%, about 60% to about 90%, about 60% to about 85%, about 70% to about 95%, about 70% to about 90%, about 70% to about 85%, about 75% to about 90%, about 80% to about 95%, about 80% to about 90%, about 70% to about 85%, about 75% to about 85%, about 70% to about 80%, and about 75% to about 80%.

In certain embodiments, the core layer of blocked multilayer film may comprise a number of core sublayers. The core layer of blocked multilayer film may comprise any suitable number of sublayers. In certain embodiments, the core layer of blocked multilayer film may comprise at least one sublayer. In certain embodiments, the core layer of blocked multilayer film may comprise at least two sublayers. In some embodiments, it can be advantageous to limit the number of sublayers, for example, the blocked multilayer film may comprise a total number of 1 to 15 sublayers. In certain embodiments, the core layer of blocked multilayer film may comprise a total number of 5, 7, 11, or 13 sublayers. In another embodiment, the core layer of blocked multilayer film may comprise a total number of 13 sublayers. In another embodiment, the core layer of blocked multilayer film may comprise a total number of 5 sublayers.

In certain embodiments, the core layer of blocked multilayer film may include a number of core sublayers. The core layer of blocked multilayer film may comprise any suitable number of core sublayers. In certain embodiments, the core layer of blocked multilayer film may comprise a total number of 4, 6, 10, or 12 core sublayers. In another embodiment, the core layer of blocked multilayer film may comprise a total number of 12 core sublayers. In another embodiment, the core layer of blocked multilayer film may comprise a total number of 4 core sublayers. In some another embodiment, each of the core sublayers may have the same composition or each may have different compositions.

In certain embodiments, the core layer of blocked multilayer film may include a number of blocking layers. The core layer of blocked multilayer film may comprise any suitable number of blocking layers. For example, the core layer of the blocked multilayer film may comprise 1 or 2 blocking layers, and a remaining number of core sublayers. In certain embodiments, the core layer of blocked multilayer film may comprise a single blocking layer. In certain embodiments, the core layer of blocked multilayer film may comprise a single blocking layer, and a remaining number of core sublayers. In certain embodiments, the core layer of blocked multilayer film may comprise at least one core sublayer and a blocking layer.

In one embodiment, the core layer of blocked multilayer film may comprise a total number of 13 sublayers including a blocking layer, and 12 core sublayers. In another embodiment, the core layer of blocked multilayer film may comprise a total number of 9 sublayers including a blocking layer, and 8 core sublayers. In another embodiment, the core layer of blocked multilayer film may comprise a total number of 5 sublayers including a blocking layer, and 4 core sublayers. In another embodiment, the core layer of blocked multilayer film may comprise a total number of 3 sublayers including a blocking layer, and 2 core sublayers.

In some embodiments, each core sublayer of blocked multilayer film comprises a composition. For example, each core sublayer of blocked multilayer film may comprise a polyolefin polymer. In some embodiments, each core sublayer may comprise a polyethylene polymer or copolymer. In some embodiments, each core sublayer may comprise low density polyethylene (LDPE), medium density polyethylene (MDPE), or high density polyethylene (HDPE). In some embodiments, each core sublayer comprises MDPE. The MDPE may be linear medium density polyethylene (LMDPE), metallocene MDPE, or metallocene LMDPE. The LDPE may be linear low density polyethylene (LLDPE) or metallocene LLDPE. In some embodiments, the core layer may comprise HDPE, MDPE, LMDPE, LDPE, LLDPE, or combinations thereof. Each of HDPE, MDPE, LMDPE, and LLDPE, for example, may be provided using Ziegler-Natta or metallocene catalysis. In some embodiments, each core sublayer comprises medium density polyethylene, ethylene-octene copolymer. In some embodiments, each core sublayer may comprise ELITE™ 5940G (mLMDPE-C8) resin available from Dow. In some embodiments, each core sublayer independently comprises a compatibilizer.

In some embodiments, each core sublayer comprises a volume percent of about 4% or about 8% of the blocked multilayer film. In some embodiments, each core sublayer comprises a volume percent of about 4%, about 7%, and about 7.5% of the multilayer film. The volume percent of each core sublayer may be one of several different percentages or fall within one of several different ranges. The volume percent of each core sublayer may be one of the following values: about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, and about 25%. It is within the present disclosure for the volume percent of each core sublayer to fall within one of the following ranges: about 2% to about 30%, about 2% to about 25%, about 2% to about 20%, about 2% to about 15%, about 2% to about 10%, about 3% to about 25%, about 3% to about 20%, about 3% to about 15%, about 3% to about 10%, about 5% to about 20%, about 5% to about 15%, and about 5% to about 10%.

In some embodiments, the blocking layer of the blocked multilayer film comprises a composition. In some embodiments, the composition of the blocking layer is not restricted, and may include all manner of polymers having a tendency to block (i.e., form an attraction and/or adhere to an adjacent layer of film or sheet). For example, blocking layer of the multilayer film comprises a polyolefin plastomer. In some embodiments, the blocking layer may comprise a polyethylene polymer or copolymer. In some embodiments, the blocking layer may comprise a polyethylene plastomer. In some embodiments, the blocking layer may comprise an ethylene alpha-olefin plastomer. In some embodiments, the blocking layer may comprise AFFINITY™ PL1850G (POP) available from Dow.

In some embodiments, blocking layer comprises a volume percent of about 10% of the blocked multilayer film. The volume percent of blocking layer may be one of several different percentages or fall within one of several different ranges. The volume percent of blocking layer may be one of the following values: about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, and about 30%. It is within the present disclosure for the volume percent of blocking layer to fall within one of the following ranges: less than about 30%, less than about 25%, less than about 20%, about 5% to about 30%, about 5% to about 25%, about 5% to about 20%, about 5% to about 15%, about 5% to about 12%, about 5% to about 10%, about 8% to about 30%, about 8% to about 25%, about 8% to about 20%, about 8% to about 15%, about 8% to about 12%, and about 8% to about 10%.

In certain embodiments, the non-blocked multilayer film may comprise a core layer. In certain embodiments, the core layer of non-blocked multilayer film may comprise a number of core sublayers. The core layer of non-blocked multilayer film may comprise any suitable number of core sublayers. In certain embodiments, the core layer of non-blocked multilayer film may comprise at least one core sublayer. In certain embodiments, the core layer of non-blocked multilayer film may comprise at least two core sublayers. For example, the non-blocked multilayer film may comprise a total number of 1 to 10 core sublayers. In certain embodiments, the core layer of non-blocked multilayer film may comprise a total number of 3, 4, 5, 6, or 7 core sublayers. In another embodiment, the core layer of non-blocked multilayer film may comprise a total number of 6 core sublayers. In another embodiment, the core layer of non-blocked multilayer film may comprise a total number of 2 core sublayers. In some another embodiment, each of the core sublayers may have the same composition or each may have different compositions.

In certain embodiments, the non-blocked multilayer film may include a number of skin layers. In one embodiment, the skin layer is a non-blocking layer. The non-blocked multilayer film may comprise any suitable number of skin layers. For example, the non-blocked multilayer film may comprise 1 or 2 skin layers. In certain embodiments, the non-blocked multilayer film may comprise a single skin layer. In certain embodiments, the non-blocked multilayer film may comprise at least one core sublayer and a single skin layer.

In one embodiment, the non-blocked multilayer film may comprise a skin layer, and 6 core sublayers. In another embodiment, the non-blocked multilayer film may comprise a skin layer, and 4 core sublayers. In another embodiment, the non-blocked multilayer film may comprise a skin layer, and 2 core sublayers.

In some embodiments, each core sublayer of non-blocked multilayer film comprises a composition. For example, each core sublayer of non-blocked multilayer film may comprise a polyolefin polymer. In some embodiments, each core sublayer may comprise a polyethylene polymer or copolymer. In some embodiments, each core sublayer independently may comprise low density polyethylene (LDPE), medium density polyethylene (MDPE), or high density polyethylene (HDPE). In some embodiments, each core sublayer independently comprises MDPE. The MDPE may be linear medium density polyethylene (LMDPE), metallocene MDPE, or metallocene LMDPE. The LDPE may be linear low density polyethylene (LLDPE) or metallocene LLDPE. In some embodiments, each core sublayer may independently comprise HDPE, MDPE, LMDPE, LDPE, LLDPE, or combinations thereof. Each of HDPE, MDPE, LMDPE, and LLDPE, for example, may be provided using Ziegler-Natta or metallocene catalysis. In some embodiments, each core sublayer comprises medium density polyethylene, ethylene-octene copolymer. In some embodiments, each core sublayer may comprise Elite 5940G (mLMDPE-C8) resin available from Dow. In some embodiments, each core sublayer independently comprises a compatibilizer.

In some embodiments, each core sublayer comprises a volume percent of about 8% or about 16% of the non-blocked multilayer film. In some embodiments, each core sublayer comprises a volume percent of about 8%, about 14%, and about 15% of the multilayer film. The volume percent of each core sublayer may be one of several different percentages or fall within one of several different ranges. The volume percent of each core sublayer may be one of the following values: about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 23%, about 25%, about 26%, about 27%, about 28%, about 29%, and about 30%. It is within the present disclosure for the volume percent of each core sublayer to fall within one of the following ranges: about 5% to about 40%, about 5% to about 30%, about 5% to about 25%, about 5% to about 20%, about 5% to about 15%, about 5% to about 10%, about 6% to about 25%, about 6% to about 25%, about 6% to about 20%, about 6% to about 15%, about 6% to about 10%, about 10% to about 20%, and about 10% to about 15%.

In one embodiment, the skin layer of the non-blocked multilayer film is arranged to contact the core layer in a spaced apart configuration from the tie layer, when the optional core layer is present. For example, when the optional core layer of the non-blocked multilayer film is present, the tie layer is arranged to extend between and interconnect the barrier layer and the core layer. In another embodiment, the skin layer of the non-blocked multilayer film is arranged to contact the tie layer in a spaced apart configuration from the barrier layer, when the optional core layer is not present. For example, when the optional core layer of the non-blocked multilayer film is not present, the tie layer is arranged to extend between and interconnect the barrier layer and the skin layer.

In certain embodiments, the skin layer of multilayer film is configured to form an outer surface, upon which any suitable layer or film is attached. For example, each skin layer of the film may independently have one or more of a print layer, a seal layer, a print film, a sealable film, or a second multilayer film according to the present disclosure configured to be in contact, such as direct contact or through an interconnecting adhesive, with the skin layer.

In some embodiments, the skin layer of the non-blocked multilayer film comprises a composition. In some embodiments, the composition of the skin layer is not restricted, and may include all manner of polymers having a reduced tendency to block (i.e., form an attraction and/or adhere to an adjacent layer of film or sheet), for example, a non-blocking layer. In some embodiments, the skin layer has a reduced tendency to block as a result of high heat resistance.

In some embodiments, the skin layer may additionally comprise any suitable additive, such as an anti-block additive or slip additive. In some embodiments, skin layer of the multilayer film comprises a polyolefin polymer. In some embodiments, the skin layer may comprise a polyethylene polymer or copolymer. In some embodiments, the skin layer may comprise a low density polyethylene (LDPE), medium density polyethylene (MDPE), or high density polyethylene (HDPE). The MDPE may be linear medium density polyethylene (LMDPE), metallocene MDPE, or metallocene LMDPE. The LDPE may be linear low density polyethylene (LLDPE) or metallocene LLDPE. In some embodiments, the skin layer may comprise HDPE, MDPE, LMDPE, LDPE, LLDPE, or combinations thereof. Each of HDPE, MDPE, LMDPE, and LLDPE, for example, may be provided using Ziegler-Natta or metallocene catalysis. In some embodiments, the skin layer comprises HDPE. In some embodiments, the skin layer may comprise ELITE™ 5960G1 available from Dow or ALATHON M6210 available from LyondellBasell.

In some embodiments, skin layer comprises a volume percent of about 10% of the non-blocked multilayer film. The volume percent of skin layer may be one of several different percentages or fall within one of several different ranges. The volume percent of skin layer may be one of the following values: about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, and about 30%. It is within the present disclosure for the volume percent of skin layer to fall within one of the following ranges: less than about 30%, less than about 25%, less than about 20%, about 5% to about 30%, about 5% to about 25%, about 5% to about 20%, about 5% to about 15%, about 5% to about 12%, about 5% to about 10%, about 8% to about 30%, about 8% to about 25%, about 8% to about 20%, about 8% to about 15%, about 8% to about 12%, and about 8% to about 10%.

Tie Layer

In certain embodiments, tie layer of the multilayer film, such as blocked multilayer film or non-blocked multilayer film, comprises a polyolefin polymer. In certain embodiments, the tie layer is configured to extend between and connect the barrier layer and an adjacent layer, such as a first layer. In certain embodiments, the tie layer is configured to extend between and connect the barrier layer and first layer. In one embodiment, the first layer is a core layer. In another embodiment, the first layer is a skin layer. In some embodiments, the tie layer may comprise a polyethylene polymer or copolymer. In some embodiments, the tie layer comprises an adhesive polyolefin polymer (e.g., an adhesive). In some embodiments, the tie layer comprises modified polyethylene. In some embodiments, the tie layer may comprise ADMER® SF755A (Adh-mPE) resin available from Mitsui.

In some embodiments, blocked multilayer film comprises two tie layers, such as a first tie layer and a second tie layer. In some embodiments, each tie layer (e.g. first tie layer, second tie layer) of blocked multilayer film comprises a particular volume percent of in the multilayer film. In some embodiments, each tie layer of blocked multilayer film comprises a volume percent of about 5% of the multilayer film. The volume percent of each tie layer may be one of several different percentages or fall within one of several different ranges. The volume percent of each tie layer may be one of the following values: about 2%, about 3%, about 4%, about 5%, about 6%, about 7%, and about 8%. It is within the present disclosure for the volume percent of each tie layer to fall within one of the following ranges: less than about 10%, less than about 9%, less than about 8%, about 2% to about 10%, about 2% to about 8%, about 2% to about 6%, about 3% to about 10%, about 3% to about 8%, about 3% to about 6%, about 4% to about 10%, about 4% to about 8%, and about 4% to about 6%.

In some embodiments, the tie layer of blocked multilayer film comprises a cumulative volume percent of each tie layer present in the multilayer film. The tie layer of a blocked multilayer film, for example, may include cumulative volume percent of about 10% in a multilayer film comprising a first tie layer with a volume percent of about 5% and a second tie layer with a volume percent of about 5%. In some embodiments, tie layer of blocked multilayer film comprises a cumulative volume percent of about 10% of the multilayer film. The cumulative volume percent of the tie layer may be one of several different percentages or fall within one of several different ranges. The cumulative volume percent of the tie layer may be one of the following values: about 5%, about 6%, about 7%, about 8%, about 9%, about 10%, about 11%, about 12%, about 13%, about 14%, and about 15%. It is within the present disclosure for the cumulative volume percent of the tie layer to fall within one of the following ranges: about 5% to about 15%, about 5% to about 10%, about 5% to about 8%, about 8% to about 15%, about 8% to about 10%, and about 10% to about 15%.

An exemplary configuration for a 9-layered non-blocked multilayer film in accordance with the present disclosure includes, but is not limited to the following representative layer structure: barrier/tie/core/core/core/core/core/core/skin. An exemplary configuration for a 7-layered non-blocked multilayer film in accordance with the present disclosure includes, but is not limited to the following representative layer structure: barrier/tie/core/core/core/core/skin. An exemplary configuration for a 5-layered non-blocked multilayer film in accordance with the present disclosure includes, but is not limited to the following representative layer structure: barrier/tie/core/core/skin.

An exemplary configuration for a 17-layered blocked multilayer film in accordance with the present disclosure include but are not limited to the following representative structure: barrier/tie/core/core/core/core/core/core/blocking/core/core/core/core/core/core/tie/barrier. An exemplary configuration for a 13-layered blocked multilayer film in accordance with the present disclosure include but are not limited to the following representative structure: barrier/tie/core/core/core/core/blocking/core/core/core/core/tie/barrier. An exemplary configuration for a 9-layered blocked multilayer film in accordance with the present disclosure include but are not limited to the following representative structure: barrier/tie/core/core/blocking/core/core/tie/barrier.

A potential feature of a multilayer film, such as blocked multilayer film or non-blocked multilayer film, according to exemplary embodiments of the present disclosure is that the multilayer film possesses good barrier performance as measured by water vapor transmission rate (WVTR) and oxygen transmission rate (OTR). Moisture vapor transmission rate (MVTR), interchangeably used with water vapor transmission rate (WVTR), is a measure of the passage of water vapor through a substance. It is a measure of the permeability for vapor barriers. Oxygen transmission rate (OTR) is the measurement of the amount of oxygen gas that passes through a substance over a given period.

In one example, the multilayer film, such as blocked multilayer film or non-blocked multilayer film, of the present disclosure may comprise advantageous barrier properties. In some embodiments, the multilayer film provides a water vapor transmission rate (WVTR) of about 0.52 g/100 in$^2$/day. In some embodiments, the multilayer film provides a water vapor transmission rate (WVTR) of about 0.5 g/100 in$^2$/day. The WVTR of the multilayer film may be one of several different values or fall within one of several different ranges. The WVTR of the multilayer film may be one of the following values: about 0.45 g/100 in$^2$/day, about 0.46 g/100 in$^2$/day, about 0.47 g/100 in$^2$/day, about 0.48 g/100 in$^2$/day, about 0.49 g/100 in$^2$/day, about 0.50 g/100 in$^2$/day, about 0.51 g/100 in$^2$/day, about 0.52 g/100 in$^2$/day, about 0.53 g/100 in$^2$/day, about 0.54 g/100 in$^2$/day, and about 0.55 g/100 in$^2$/day. It is within the present disclosure for the WVTR of the multilayer film to fall within one of the following ranges: less than about 0.8 g/100 in$^2$/day, less than about 0.70 g/100 in$^2$/day, less than about 0.65 g/100 in$^2$/day, less than about 0.60 g/100 in$^2$/day, less than about 0.55 g/100 in$^2$/day, about 0.2 g/100 in$^2$/day to about 0.8 g/100 in$^2$/day, about 0.2 g/100 in$^2$/day to about 0.7 g/100 in$^2$/day, about 0.2 g/100 in$^2$/day to about 0.6 g/100 in$^2$/day, about 0.3 g/100 in$^2$/day to about 0.8 g/100 in$^2$/day, about 0.3 g/100 in$^2$/day to about 0.7 g/100 in$^2$/day, about 0.3 cc/100 in$^2$/day to about 0.6 g/100 in$^2$/day, about 0.4 g/100 in$^2$/day to about 0.8 cc/100 in$^2$/day, about 0.4 g/100 in$^2$/day to about 0.7 g/100 in$^2$/day, and about 0.4 cc/100 in$^2$/day to about 0.6 g/100 in$^2$/day.

In some embodiments, the multilayer film has a thickness of less than about 2 mil and provides a water vapor transmission rate (WVTR) of less than about 0.52 g/100 in$^2$/day. In some embodiments, the multilayer film has a thickness of less than about 2 mil and provides a water vapor transmission rate (WVTR) of less than about 0.5 g/100 in$^2$/day. The multilayer film may have a thickness of less than about 2 mil and the WVTR of the multilayer film may be one of several different values or fall within one of several different ranges. The multilayer film may have a thickness of less than about 2 mil and the WVTR of the multilayer film may be one of the following values: about 0.45 g/100 in$^2$/day, about 0.46 g/100 in$^2$/day, about 0.47 g/100 in$^2$/day, about 0.48 g/100 in$^2$/day, about 0.49 g/100 in$^2$/day, about 0.50 g/100 in$^2$/day, about 0.51 g/100 in$^2$/day, about 0.52 g/100 in$^2$/day, about 0.53 g/100 in$^2$/day, about 0.54 g/100 in$^2$/day, and about 0.55 g/100 in$^2$/day. It is within the present disclosure for the multilayer film to have a thickness of less than about 2 mil and the WVTR of the multilayer film to fall within one of the following ranges: less than about 0.8 g/100 in$^2$/day, less than about 0.70 g/100 in$^2$/day, less than about 0.65 g/100 in$^2$/day, less than about 0.60 g/100 in$^2$/day, less than about 0.55 g/100 in$^2$/day, about 0.2 g/100 in$^2$/day to about 0.8 g/100 in$^2$/day, about 0.2 g/100 in$^2$/day to about 0.7 g/100 in$^2$/day, about 0.2 g/100 in$^2$/day to about 0.6 g/100 in$^2$/day, about 0.3 g/100 in$^2$/day to about 0.8 g/100 in$^2$/day, about 0.3 g/100 in$^2$/day to about 0.7 g/100 in$^2$/day, about 0.3 cc/100 in$^2$/day to about 0.6 g/100 in$^2$/day, about 0.4 g/100 in$^2$/day to about 0.8 cc/100 in$^2$/day, about 0.4 g/100 in$^2$/day to about 0.7 g/100 in$^2$/day, and about 0.4 cc/100 in$^2$/day to about 0.6 g/100 in$^2$/day.

In some embodiments, the multilayer film has a thickness of less than about 1 mil and provides a water vapor transmission rate (WVTR) of about 0.52 g/100 in$^2$/day. In some embodiments, the multilayer film has a thickness of less than about 1 mil and provides a water vapor transmission rate (WVTR) of about 0.5 g/100 in$^2$/day. The multilayer film may have a thickness of less than about 1 mil and the WVTR of the multilayer film may be one of several different values or fall within one of several different ranges. The multilayer film may have a thickness of less than about 1 mil and the WVTR of the multilayer film may be one of the following values: about 0.45 g/100 in$^2$/day, about 0.46 g/100 in$^2$/day, about 0.47 g/100 in$^2$/day, about 0.48 g/100 in$^2$/day, about 0.49 g/100 in$^2$/day, about 0.50 g/100 in$^2$/day, about 0.51 g/100 in$^2$/day, about 0.52 g/100 in$^2$/day, about 0.53 g/100 in$^2$/day, about 0.54 g/100 in$^2$/day, and about 0.55 g/100 in$^2$/day. It is within the present disclosure for the multilayer film to have a thickness of less than about 1 mil and the WVTR of the multilayer film to fall within one of the following ranges: less than about 0.8 g/100 in$^2$/day, less than about 0.70 g/100 in$^2$/day, less than about 0.65 g/100 in$^2$/day, less than about 0.60 g/100 in$^2$/day, less than about 0.55 g/100 in$^2$/day, about 0.2 g/100 in$^2$/day to about 0.8 g/100 in$^2$/day, about 0.2 g/100 in$^2$/day to about 0.7 g/100 in$^2$/day, about 0.2 g/100 in$^2$/day to about 0.6 g/100 in$^2$/day, about 0.3 g/100 in$^2$/day to about 0.8 g/100 in$^2$/day, about 0.3 g/100 in$^2$/day to about 0.7 g/100 in$^2$/day, about 0.3 cc/100 in$^2$/day to about 0.6 g/100 in$^2$/day, about 0.4 g/100 in$^2$/day to about 0.8 cc/100 in$^2$/day, about 0.4 g/100 in$^2$/day to about 0.7 g/100 in$^2$/day, and about 0.4 cc/100 in$^2$/day to about 0.6 g/100 in$^2$/day.

In some embodiments, the multilayer film has a thickness of about 0.6 mil to about 1 mil, and provides a water vapor transmission rate (WVTR) of about 0.52 g/100 in$^2$/day. In some embodiments, the multilayer film has a thickness of about 0.6 mil to about 1 mil, and provides a water vapor transmission rate (WVTR) of about 0.5 g/100 in$^2$/day. The multilayer film may have a thickness of about 0.6 mil to about 1 mil, and the WVTR of the multilayer film may be one of several different values or fall within one of several different ranges. The multilayer film may have a thickness of about 0.6 mil to about 1 mil, and the WVTR of the multilayer film may be one of the following values: about 0.45 g/100 in$^2$/day, about 0.46 g/100 in$^2$/day, about 0.47 g/100 in$^2$/day, about 0.48 g/100 in$^2$/day, about 0.49 g/100 in$^2$/day, about 0.50 g/100 in$^2$/day, about 0.51 g/100 in$^2$/day, about 0.52 g/100 in$^2$/day, about 0.53 g/100 in$^2$/day, about 0.54 g/100 in$^2$/day, and about 0.55 g/100 in$^2$/day. It is within the present disclosure for the multilayer film to have a thickness of about 0.6 mil to about 1 mil, and the WVTR of the multilayer film to fall within one of the following ranges: less than about 0.8 g/100 in$^2$/day, less than about 0.70 g/100 in$^2$/day, less than about 0.65 g/100 in$^2$/day, less than about 0.60 g/100 in$^2$/day, less than about 0.55 g/100 in$^2$/day, about 0.2 g/100 in$^2$/day to about 0.8 g/100 in$^2$/day, about 0.2 g/100 in$^2$/day to about 0.7 g/100 in$^2$/day, about 0.2 g/100 in$^2$/day to about 0.6 g/100 in$^2$/day, about 0.3 g/100 in$^2$/day to about 0.8 g/100 in$^2$/day, about 0.3 g/100 in$^2$/day to about 0.7 g/100 in$^2$/day, about 0.3 cc/100 in$^2$/day to about 0.6 g/100 in$^2$/day, about 0.4 g/100 in$^2$/day to about 0.8 cc/100 in$^2$/day, about 0.4 g/100 in$^2$/day to about 0.7 g/100 in$^2$/day, and about 0.4 cc/100 in$^2$/day to about 0.6 g/100 in$^2$/day.

In some embodiments, the multilayer film provides an oxygen transmission rate (OTR) of about 0.06 cc/100 in$^2$/day. In some embodiments, the multilayer film provides an oxygen transmission rate (OTR) of about 0.04 cc/100 in$^2$/day. The OTR of the multilayer film may be one of several different values or fall within one of several different ranges. The OTR of the multilayer film may be one of the following values: about 0.01 cc/100 in$^2$/day, about 0.02 cc/100 in$^2$/day, about 0.03 cc/100 in$^2$/day, about 0.04 cc/100 in$^2$/day, about 0.05 cc/100 in$^2$/day, about 0.06 cc/100 in$^2$/day, about 0.07 cc/100 in$^2$/day, and about 0.08 cc/100 in$^2$/day. It is within the present disclosure for the OTR of the multilayer film to fall within one of the following ranges: less than about 0.07 cc/100 in$^2$/day, less than about 0.06 cc/100 in$^2$/day, less than about 0.05 cc/100 in$^2$/day, less than about 0.04 cc/100 in$^2$/day, less than about 0.03 cc/100 in$^2$/day, less than about 0.02 cc/100 in$^2$/day, about 0.02 cc/100 in$^2$/day to about 0.08 cc/100 in$^2$/day, about 0.02 cc/100 in$^2$/day to about 0.07 cc/100 in$^2$/day, about 0.02 cc/100 in$^2$/day to about 0.06 cc/100 in$^2$/day, about 0.03 cc/100 in$^2$/day to about 0.08 cc/100 in$^2$/day, about 0.03 cc/100 in$^2$/day to about 0.07 cc/100 in$^2$/day, about 0.03 cc/100 in$^2$/day to about 0.06 cc/100 in$^2$/day, about 0.04 cc/100 in$^2$/day to about 0.08 cc/100 in$^2$/day, about 0.04 cc/100 in$^2$/day to about 0.07 cc/100 in$^2$/day, and about 0.04 cc/100 in$^2$/day to about 0.06 cc/100 in$^2$/day.

In some embodiments, the multilayer film has a thickness of less than about 2 mil and provides an oxygen transmission rate (OTR) of less than about 0.06 cc/100 in$^2$/day. In some embodiments, the multilayer film has a thickness of less than about 2 mil and provides an oxygen transmission rate (OTR) of less than about 0.04 cc/100 in$^2$/day. The multilayer film may have a thickness of less than about 2 mil and the OTR of the multilayer film may be one of several different values or fall within one of several different ranges. The multilayer film may have a thickness of less than about 2 mil and the OTR of the multilayer film may be one of the following values: about 0.01 cc/100 in$^2$/day, about 0.02 cc/100 in$^2$/day, about 0.03 cc/100 in$^2$/day, about 0.04 cc/100 in$^2$/day, about 0.05 cc/100 in$^2$/day, about 0.06 cc/100 in$^2$/day, about 0.07 cc/100 in$^2$/day, and about 0.08 cc/100 in$^2$/day. It is within the present disclosure for the multilayer film to have a thickness of less than about 2 mil and the OTR of the multilayer film to fall within one of the following ranges: less than about 0.07 cc/100 in$^2$/day, less than about 0.06 cc/100 in$^2$/day, less than about 0.05 cc/100 in$^2$/day, less than about 0.04 cc/100 in$^2$/day, less than about 0.03 cc/100 in$^2$/day, less than about 0.02 cc/100 in$^2$/day, about 0.02 cc/100 in$^2$/day to about 0.08 cc/100 in$^2$/day, about 0.02 cc/100 in$^2$/day to about 0.07 cc/100 in$^2$/day, about 0.02 cc/100 in$^2$/day to about 0.06 cc/100 in$^2$/day, about 0.03 cc/100 in$^2$/day to about 0.08 cc/100 in$^2$/day, about 0.03 cc/100 in$^2$/day to about 0.07 cc/100 in$^2$/day, about 0.03 cc/100 in$^2$/day to about 0.06 cc/100 in$^2$/day, about 0.04 cc/100 in$^2$/day to about 0.08 cc/100 in$^2$/day, about 0.04 cc/100 in$^2$/day to about 0.07 cc/100 in$^2$/day, and about 0.04 cc/100 in$^2$/day to about 0.06 cc/100 in$^2$/day.

In some embodiments, the multilayer film has a thickness of less than about 1 mil and provides an oxygen transmission rate (OTR) of about 0.06 cc/100 in$^2$/day. In some embodiments, the multilayer film has a thickness of less than about 1 mil and provides an oxygen transmission rate (OTR) of about 0.04 cc/100 in$^2$/day. The multilayer film may have a thickness of less than about 1 mil and the OTR of the multilayer film may be one of several different values or fall within one of several different ranges. The multilayer film may have a thickness of less than about 1 mil and the OTR of the multilayer film may be one of the following values: about 0.01 cc/100 in$^2$/day, about 0.02 cc/100 in$^2$/day, about 0.03 cc/100 in$^2$/day, about 0.04 cc/100 in$^2$/day, about 0.05 cc/100 in$^2$/day, about 0.06 cc/100 in$^2$/day, about 0.07 cc/100 in$^2$/day, and about 0.08 cc/100 in$^2$/day. It is within the present disclosure for the multilayer film to have a thickness of less than about 1 mil and the OTR of the multilayer film to fall within one of the following ranges: less than about 0.07 cc/100 in$^2$/day, less than about 0.06 cc/100 in$^2$/day, less than about 0.05 cc/100 in$^2$/day, less than about 0.04 cc/100 in$^2$/day, less than about 0.03 cc/100 in$^2$/day, less than about 0.02 cc/100 in$^2$/day, about 0.02 cc/100 in$^2$/day to about 0.08 cc/100 in$^2$/day, about 0.02 cc/100 in$^2$/day to about 0.07 cc/100 in$^2$/day, about 0.02 cc/100 in$^2$/day to about 0.06 cc/100 in$^2$/day, about 0.03 cc/100 in$^2$/day to about 0.08 cc/100 in²/day, about 0.03 cc/100 in²/day to about 0.07 cc/100 in²/day, about 0.03 cc/100 in²/day to about 0.06 cc/100 in²/day, about 0.04 cc/100 in²/day to about 0.08 cc/100 in²/day, about 0.04 cc/100 in²/day to about 0.07 cc/100 in²/day, and about 0.04 cc/100 in²/day to about 0.06 cc/100 in²/day.

In some embodiments, the multilayer film has a thickness of about 0.6 mil to about 1 mil, and provides an oxygen transmission rate (OTR) of about 0.06 cc/100 in²/day. In some embodiments, the multilayer film has a thickness of about 0.6 mil to about 1 mil, and provides an oxygen transmission rate (OTR) of about 0.04 cc/100 in²/day. The multilayer film may have a thickness of about 0.6 mil to about 1 mil, and the OTR of the multilayer film may be one of several different values or fall within one of several different ranges. The multilayer film may have a thickness of about 0.6 mil to about 1 mil, and the OTR of the multilayer film may be one of the following values: about 0.01 cc/100 in²/day, about 0.02 cc/100 in²/day, about 0.03 cc/100 in²/day, about 0.04 cc/100 in²/day, about 0.05 cc/100 in²/day, about 0.06 cc/100 in²/day, about 0.07 cc/100 in²/day, and about 0.08 cc/100 in²/day. It is within the present disclosure for the multilayer film to have a thickness of about 0.6 mil to about 1 mil, and the OTR of the multilayer film to fall within one of the following ranges: less than about 0.07 cc/100 in²/day, less than about 0.06 cc/100 in²/day, less than about 0.05 cc/100 in²/day, less than about 0.04 cc/100 in²/day, less than about 0.03 cc/100 in²/day, less than about 0.02 cc/100 in²/day, about 0.02 cc/100 in²/day to about 0.08 cc/100 in²/day, about 0.02 cc/100 in²/day to about 0.07 cc/100 in²/day, about 0.02 cc/100 in²/day to about 0.06 cc/100 in²/day, about 0.03 cc/100 in²/day to about 0.08 cc/100 in²/day, about 0.03 cc/100 in²/day to about 0.07 cc/100 in²/day, about 0.03 cc/100 in²/day to about 0.06 cc/100 in²/day, about 0.04 cc/100 in²/day to about 0.08 cc/100 in²/day, about 0.04 cc/100 in²/day to about 0.07 cc/100 in²/day, and about 0.04 cc/100 in²/day to about 0.06 cc/100 in²/day.

To provide a more concise description, some of the quantitative expressions given herein are not qualified with the term "about." It is understood that, whether the term "about" is used explicitly or not, every quantity given herein is meant to refer to the actual given value, and it is also meant to refer to the approximation to such given value that would reasonably be inferred based on the ordinary skill in the art, including equivalents and approximations due to the experimental and/or measurement conditions for such given value.

Another potential feature of a multilayer film, such as blocked multilayer film or non-blocked multilayer film, according to exemplary embodiments of the present disclosure is that the multilayer film has improved heat resistance. For example, multilayer films comprising an exposed barrier layer (i.e., a multilayer film that excludes any coating (e.g., metal), a printing layer, seal layer, print film, or sealable film adhered to or in contact with the barrier layer) may have improved heat resistance. Furthermore, multilayer film of the present disclosure may provide markedly faster packaging line speeds as a result of higher heat resistance provided by the exposed barrier layer that may contact the packaging line equipment. In some embodiments, the multilayer film of the present disclosure provides about 50° F. more heat resistance or about 40° F. more heat resistance in comparison to comparative PE based oriented print webs (e.g., films) lacking a barrier layer comprising a polar polymer resin, such as EVOH or nylon.

Additionally, a multilayer film according to exemplary embodiments of the present disclosure has desirable sealing properties for packaging. For example, multilayer film of the present disclosure, including a laminated seal layer, may provide a seal initiation temperature (SIT) (at about 200 gf) of about 200° F. (93° C.) or lower (e.g., 150° F. to about 200° F. or about 150° C. to about 190° F.) for high speed horizontal form fill seal machines (HFFS) equipment.

A potential feature of a blocked multilayer film according to exemplary embodiments of the present disclosure is that the blocked multilayer film has improved resistance to curling. Curling of the multilayer films can be disadvantageous to the handling of the film during processing and packaging. As an example, the blocked multilayer film does not have to be manipulated to modify one or more plastic polymers, resins, or materials within the layer configuration to provide a comparatively flatter structure in any direction, such as machine and transverse direction. In particular, the properties of one or more plastic polymers, resins, or materials, such as stress, density, or melting point of the blocked multilayer film do not require manipulation to provide a comparatively flatter film, with a resistance to curling, than a non-blocked multilayer film.

Another potential feature of multilayer film, such as blocked multilayer film or non-blocked multilayer film, according to exemplary embodiments of the present disclosure is that the multilayer film has improved adherence properties. For example, the multilayer film, according to exemplary embodiments of the present disclosure includes a barrier layer on the outer surface of the film comprising EVOH. In some embodiments, the multilayer film, according to exemplary embodiments of the present disclosure includes a barrier layer comprising EVOH, a polyamide (e.g., nylon), or a combination thereof. Without being bound by any theory, the barrier layer possesses a tendency to interact (i.e., form an attraction and/or adhere) with compatible coatings, such as ink, metal, adhesives, cold seal, and seal coatings, as a result of the polarity, among other properties, of barrier layer. For example, a feature of the multilayer film according to exemplary embodiments of the present disclosure is improved metal adhesion of a metal layer to the barrier layer comprising EVOH. For example, a feature of the multilayer film according to exemplary embodiments of the present disclosure is improved metal adhesion of a metal layer to the barrier layer comprising a polar polymer resin (polar resin).

Another potential feature of multilayer film, such as blocked multilayer film or non-blocked multilayer film, according to exemplary embodiments of the present disclosure is that the multilayer film can be recycled. For example, the multilayer film or metallized multilayer film of the present disclosure may be recyclable. Recyclable means that a material can be added (such as regrind) back into an extrusion or other formation process without segregation of components of the material. For example, recyclable films can be reprocessed back into the polyolefin recycling stream and used again for film production or other downstream plastics processing. Recyclability of the multilayer film or metallized multilayer film of the present disclosure minimizes the amount of disposable waste created. In comparison, multilayer films comprising a majority (i.e. over 50% by weight or volume) of polypropylene, polyamide, polystyrene, or polyester ordinarily cannot be reused/recycled easily in a manufacturing process with the same material from which the film was formed.

As an example, the multilayer film of the present disclosure can be recycled in a post-industrial recycling stream and post-consumer recycling stream. In particular, the multilayer film does not have to be manipulated to remove one or more materials or components prior to re-entering the extrusion process. Additionally, a multilayer film according to exemplary embodiments of the present disclosure can be recycled without the need for addition of a compatibilizer. The recyclability of the multilayer film or metallized multilayer film of the present disclosure allows for the recycling of the films after consumer use, such as in a post-consumer recycling stream. For example, the multilayer film or metallized multilayer film of the present disclosure can be considered to be store drop-off recyclable. In some embodiments, the multilayer film or metallized multilayer film of the present disclosure may have a "How2Recycle" indication.

Multilayer film, such as blocked multilayer film or non-blocked multilayer film, according to exemplary embodiments of the present disclosure satisfies a long-felt need for a film that includes many if not all the features of barrier performance, ready for recyclability, high heat resistance, and faster packaging speeds. Others have failed to provide a multilayer film that achieves combinations of these features as reflected in the appended claims. This failure is a result of the many features being associated with competitive design choices. As an example, others have created films that based on design choices possess barrier performance but fail to provide comparable heat resistance and recyclability. In comparison, multilayer film of the present disclosure overcomes the failures of others by using a barrier layer including EVOH on the outer surface of the multilayer film, which may optionally be coated, such as with a metal layer, to further improve barrier performance while maintaining recyclability.

Coated Multilayer Film

In some illustrative embodiments, the metal layer may comprise any suitable coating composition. In one example, a suitable coating composition can be a metal or a metal oxide, such as aluminum, aluminum oxide (AlOx), silicon oxide (SiOx), and the like. In another example, a suitable coating composition can be acrylic, polyvinyl alcohol (PVOH), polyvinylidene chloride (PVDC), and the like. In certain embodiments, the metal layer comprises aluminum. In certain embodiments, the metal layer comprises aluminum or aluminum oxide.

In certain embodiments, a coating, such as a metal layer, is deposited on an outer surface of the barrier layer of the multilayer film. In certain embodiments, metal layer is deposited on an outer surface of the barrier layer of the multilayer film in a coating process, such as vacuum metallization or gravure coating process. In another embodiment, a coating, such as a metal layer, is deposited on an outer surface of the barrier layer of the non-blocked multilayer film. In another embodiment, a coating, such as a metal layer, is deposited on an outer surface of the first barrier layer of a blocked multilayer film. In another embodiment, a first metal layer is deposited on an outer surface of the first barrier layer of a blocked multilayer film and a second metal layer is deposited on an outer surface of a second barrier layer of a blocked multilayer film. Without being bound by any theory, the metal of the metal layer and the barrier layer possess a tendency to interact (i.e., form an attraction and/or adhere) as a result of the polarity, among other properties, of barrier layer. For example, the barrier layer may include a polar polymer resin.

In one example, the metallized multilayer film, such as metallized blocked multilayer film or metallized non-blocked multilayer film, of the present disclosure may comprise optical density properties. In some embodiments, the optical density may be one of several different values or fall within one of several different ranges. The optical density may be one of the following values: about 1.8, about 1.9, about 2.0, about 2.1, about 2.2, and about 2.3. It is within the present disclosure for the optical density to fall within one of the following ranges: about 1.8 to about 3.5, about 1.8 to about 2.3, about 2.4 to about 2.7, about 2.8 to about 3.5, about 1.5 to about 3.0, about 1.5 to about 2.8, about 1.5 to about 2.5, about 1.5 to about 2.2, about 1.5 to about 2.0, about 1.8 to about 3.0, about 1.8 to about 2.8, about 1.8 to about 2.5, and about 1.8 to about 2.2.

A potential feature of a coated or "metallized" multilayer film, such as metallized blocked multilayer film or metallized non-blocked multilayer film, according to exemplary embodiments of the present disclosure is that the multilayer film possesses unexpected and improved barrier performance as measured by water vapor transmission rate (WVTR) and oxygen transmission rate (OTR).

In one example, the coated or "metallized" multilayer film, such as metallized blocked multilayer film or metallized non-blocked multilayer film may comprise advantageous barrier properties. In some embodiments, the metallized multilayer film provides a water vapor transmission rate (WVTR) of about 0.02 g/100 in$^2$/day. In some embodiments, the metallized multilayer film provides a water vapor transmission rate (WVTR) of about 0.03 g/100 in$^2$/day. The WVTR of the metallized multilayer film may be one of several different values or fall within one of several different ranges. The WVTR of the metallized multilayer film may be one of the following values: about 0.03 g/100 in$^2$/day, about 0.025 g/100 in$^2$/day, about 0.022 g/100 in$^2$/day, about 0.02 g/100 in$^2$/day, about 0.015 g/100 in$^2$/day, about 0.012 g/100 in$^2$/day, about 0.01 g/100 in$^2$/day, about 0.005 g/100 in$^2$/day, and about 0.002 g/100 in$^2$/day. It is within the present disclosure for the WVTR of the metallized multilayer film to fall within one of the following ranges: less than about 0.08 g/100 in$^2$/day, less than about 0.07 g/100 in$^2$/day, less than about 0.06 g/100 in$^2$/day, less than about 0.05 g/100 in$^2$/day, less than about 0.04 g/100 in$^2$/day, less than about 0.03 g/100 in$^2$/day, less than about 0.02 g/100 in$^2$/day, about 0.005 g/100 in$^2$/day to about 0.08 g/100 in$^2$/day, about 0.005 g/100 in$^2$/day to about 0.06 g/100 in$^2$/day, about 0.005 g/100 in$^2$/day to about 0.04 g/100 in$^2$/day, about 0.005 g/100 in$^2$/day to about 0.03 g/100 in$^2$/day, about 0.005 g/100 in$^2$/day to about 0.02 g/100 in$^2$/day, about 0.01 g/100 in$^2$/day to about 0.08 g/100 in$^2$/day, about 0.01 g/100 in$^2$/day to about 0.06 g/100 in$^2$/day, about 0.01 g/100 in$^2$/day to about 0.04 g/100 in$^2$/day, about 0.01 g/100 in$^2$/day to about 0.03 g/100 in$^2$/day, and about 0.01 g/100 in$^2$/day to about 0.02 g/100 in$^2$/day.

In some embodiments, the metallized multilayer film has a thickness of less than about 2 mil and provides a water vapor transmission rate (WVTR) of less than about 0.02 g/100 in$^2$/day. In some embodiments, the metallized multilayer film has a thickness of less than about 2 mil and provides a water vapor transmission rate (WVTR) of about 0.03 g/100 in$^2$/day. The metallized multilayer film may have a thickness of less than about 2 mil and the WVTR of the metallized multilayer film may be one of several different values or fall within one of several different ranges. The metallized multilayer film may have a thickness of less than about 2 mil and the WVTR of the metallized multilayer film may be one of the following values: about 0.03 g/100 in$^2$/day, about 0.025 g/100 in$^2$/day, about 0.022 g/100 in$^2$/day, about 0.02 g/100 in$^2$/day, about 0.015 g/100 in$^2$/day, about 0.012 g/100 in$^2$/day, about 0.01 g/100 in$^2$/day, about 0.005 g/100 in²/day, and about 0.002 g/100 in²/day. It is within the present disclosure for the metallized multilayer film to have a thickness of less than about 2 mil and the WVTR of the metallized multilayer film to fall within one of the following ranges: less than about 0.08 g/100 in²/day, less than about 0.07 g/100 in²/day, less than about 0.06 g/100 in²/day, less than about 0.05 g/100 in²/day, less than about 0.04 g/100 in²/day, less than about 0.03 g/100 in²/day, less than about 0.02 g/100 in²/day, about 0.005 g/100 in²/day to about 0.08 g/100 in²/day, about 0.005 g/100 in²/day to about 0.06 g/100 in²/day, about 0.005 g/100 in²/day to about 0.04 g/100 in²/day, about 0.005 g/100 in²/day to about 0.03 g/100 in²/day, about 0.005 g/100 in²/day to about 0.02 g/100 in²/day, about 0.01 g/100 in²/day to about 0.08 g/100 in²/day, about 0.01 g/100 in²/day to about 0.06 g/100 in²/day, about 0.01 g/100 in²/day to about 0.04 g/100 in²/day, about 0.01 g/100 in²/day to about 0.03 g/100 in²/day, and about 0.01 g/100 in²/day to about 0.02 g/100 in²/day.

In some embodiments, the metallized multilayer film has a thickness of less than about 1 mil and provides a water vapor transmission rate (WVTR) of about 0.02 g/100 in²/day. In some embodiments, the metallized multilayer film has a thickness of less than about 1 mil and provides a water vapor transmission rate (WVTR) of about 0.03 g/100 in²/day. The metallized multilayer film may have a thickness of less than about 1 mil and the WVTR of the metallized multilayer film may be one of several different values or fall within one of several different ranges. The metallized multilayer film may have a thickness of less than about 1 mil and the WVTR of the metallized multilayer film may be one of the following values: about 0.03 g/100 in²/day, about 0.025 g/100 in²/day, about 0.022 g/100 in²/day, about 0.02 g/100 in²/day, about 0.015 g/100 in²/day, about 0.012 g/100 in²/day, about 0.01 g/100 in²/day, about 0.005 g/100 in²/day, and about 0.002 g/100 in²/day. It is within the present disclosure for the metallized multilayer film to have a thickness of less than about 1 mil and the WVTR of the metallized multilayer film to fall within one of the following ranges: less than about 0.08 g/100 in²/day, less than about 0.07 g/100 in²/day, less than about 0.06 g/100 in²/day, less than about 0.05 g/100 in²/day, less than about 0.04 g/100 in²/day, less than about 0.03 g/100 in²/day, less than about 0.02 g/100 in²/day, about 0.005 g/100 in²/day to about 0.08 g/100 in²/day, about 0.005 g/100 in²/day to about 0.06 g/100 in²/day, about 0.005 g/100 in²/day to about 0.04 g/100 in²/day, about 0.005 g/100 in²/day to about 0.03 g/100 in²/day, about 0.005 g/100 in²/day to about 0.02 g/100 in²/day, about 0.01 g/100 in²/day to about 0.08 g/100 in²/day, about 0.01 g/100 in²/day to about 0.06 g/100 in²/day, about 0.01 g/100 in²/day to about 0.04 g/100 in²/day, about 0.01 g/100 in²/day to about 0.03 g/100 in²/day, and about 0.01 g/100 in²/day to about 0.02 g/100 in²/day.

In some embodiments, the metallized multilayer film has a thickness of about 0.6 mil to about 1 mil, and provides a water vapor transmission rate (WVTR) of about 0.02 g/100 in²/day. In some embodiments, the metallized multilayer film has a thickness of about 0.6 mil to about 1 mil, and provides a water vapor transmission rate (WVTR) of about 0.03 g/100 in²/day. The metallized multilayer film may have a thickness of about 0.6 mil to about 1 mil, and the WVTR of the metallized multilayer film may be one of several different values or fall within one of several different ranges. The metallized multilayer film may have a thickness of about 0.6 mil to about 1 mil, and the WVTR of the metallized multilayer film may be one of the following values: about 0.03 g/100 in²/day, about 0.025 g/100 in²/day, about 0.022 g/100 in²/day, about 0.02 g/100 in²/day, about 0.015 g/100 in²/day, about 0.012 g/100 in²/day, about 0.01 g/100 in²/day, about 0.005 g/100 in²/day, and about 0.002 g/100 in²/day. It is within the present disclosure for the metallized multilayer film to have a thickness of about 0.6 mil to about 1 mil, and the WVTR of the metallized multilayer film to fall within one of the following ranges: less than about 0.08 g/100 in²/day, less than about 0.07 g/100 in²/day, less than about 0.06 g/100 in²/day, less than about 0.05 g/100 in²/day, less than about 0.04 g/100 in²/day, less than about 0.03 g/100 in²/day, less than about 0.02 g/100 in²/day, about 0.005 g/100 in²/day to about 0.08 g/100 in²/day, about 0.005 g/100 in²/day to about 0.06 g/100 in²/day, about 0.005 g/100 in²/day to about 0.04 g/100 in²/day, about 0.005 g/100 in²/day to about 0.03 g/100 in²/day, about 0.005 g/100 in²/day to about 0.02 g/100 in²/day, about 0.01 g/100 in²/day to about 0.08 g/100 in²/day, about 0.01 g/100 in²/day to about 0.06 g/100 in²/day, about 0.01 g/100 in²/day to about 0.04 g/100 in²/day, about 0.01 g/100 in²/day to about 0.03 g/100 in²/day, and about 0.01 g/100 in²/day to about 0.02 g/100 in²/day.

In some embodiments, the metallized multilayer film, such as metallized blocked multilayer film or metallized non-blocked multilayer film provides an oxygen transmission rate (OTR) of about 0.002 cc/100 in²/day. The OTR of the metallized multilayer film may be one of several different values or fall within one of several different ranges. The OTR of the metallized multilayer film may be one of the following values: about 0.001 cc/100 in²/day, about 0.002 cc/100 in²/day, about 0.003 cc/100 in²/day, about 0.004 cc/100 in²/day, about 0.005 cc/100 in²/day, about 0.006 cc/100 in²/day, about 0.007 cc/100 in²/day, about 0.008 cc/100 in²/day, about 0.009 cc/100 in²/day, about 0.01 cc/100 in²/day, about 0.02 cc/100 in²/day, and about 0.03 cc/100 in²/day. It is within the present disclosure for the OTR of the metallized multilayer film to fall within one of the following ranges: less than about 0.05 cc/100 in²/day, less than about 0.04 cc/100 in²/day, less than about 0.03 cc/100 in²/day, less than about 0.02 cc/100 in²/day, less than about 0.01 cc/100 in²/day, less than about 0.005 cc/100 in²/day, less than about 0.002 cc/100 in²/day, about 0.001 cc/100 in²/day to about 0.08 cc/100 in²/day, about 0.001 cc/100 in²/day to about 0.007 cc/100 in²/day, about 0.001 cc/100 in²/day to about 0.06 cc/100 in²/day, about 0.002 cc/100 in²/day to about 0.08 cc/100 in²/day, about 0.002 cc/100 in²/day to about 0.07 cc/100 in²/day, about 0.002 cc/100 in²/day to about 0.06 cc/100 in²/day, about 0.005 cc/100 in²/day to about 0.08 cc/100 in²/day, about 0.005 cc/100 in²/day to about 0.07 cc/100 in²/day, and about 0.005 cc/100 in²/day to about 0.06 cc/100 in²/day.

In some embodiments, the metallized multilayer film has a thickness of less than about 2 mil and provides an oxygen transmission rate (OTR) of less than about 0.002 cc/100 in²/day. The metallized multilayer film may have a thickness of less than about 2 mil and the OTR of the metallized multilayer film may be one of several different values or fall within one of several different ranges. The metallized multilayer film may have a thickness of less than about 2 mil and the OTR of the metallized multilayer film may be one of the following values: about 0.001 cc/100 in²/day, about 0.002 cc/100 in²/day, about 0.003 cc/100 in²/day, about 0.004 cc/100 in²/day, about 0.005 cc/100 in²/day, about 0.006 cc/100 in²/day, about 0.007 cc/100 in²/day, about 0.008 cc/100 in²/day, about 0.009 cc/100 in²/day, about 0.01 cc/100 in²/day, about 0.02 cc/100 in²/day, and about 0.03 cc/100 in²/day. It is within the present disclosure for metallized multilayer film to have a thickness of less than about 2 mil and the OTR of the metallized multilayer film to fall within one of the following ranges: less than about 0.07 cc/100 in²/day, less than about 0.06 cc/100 in²/day, less than about 0.05 cc/100 in²/day, less than about 0.04 cc/100 in²/day, less than about 0.03 cc/100 in²/day, less than about 0.02 cc/100 in²/day, less than about 0.01 cc/100 in²/day, less than about 0.005 cc/100 in²/day, less than about 0.002 cc/100 in²/day, about 0.001 cc/100 in²/day to about 0.08 cc/100 in²/day, about 0.001 cc/100 in²/day to about 0.007 cc/100 in²/day, about 0.001 cc/100 in²/day to about 0.06 cc/100 in²/day, about 0.002 cc/100 in²/day to about 0.08 cc/100 in²/day, about 0.002 cc/100 in²/day to about 0.07 cc/100 in²/day, about 0.002 cc/100 in²/day to about 0.06 cc/100 in²/day, about 0.005 cc/100 in²/day to about 0.08 cc/100 in²/day, about 0.005 cc/100 in²/day to about 0.07 cc/100 in²/day, and about 0.005 cc/100 in²/day to about 0.06 cc/100 in²/day.

In some embodiments, the metallized multilayer film has a thickness of less than about 1 mil and provides an oxygen transmission rate (OTR) of about 0.002 cc/100 in²/day. The metallized multilayer film may have a thickness of less than about 1 mil and the OTR of the metallized multilayer film may be one of several different values or fall within one of several different ranges. The metallized multilayer film may have a thickness of less than about 1 mil and the OTR of the metallized multilayer film may be one of the following values: about 0.001 cc/100 in²/day, about 0.002 cc/100 in²/day, about 0.003 cc/100 in²/day, about 0.004 cc/100 in²/day, about 0.005 cc/100 in²/day, about 0.006 cc/100 in²/day, about 0.007 cc/100 in²/day, about 0.008 cc/100 in²/day, about 0.009 cc/100 in²/day, about 0.01 cc/100 in²/day, about 0.02 cc/100 in²/day, and about 0.03 cc/100 in²/day. It is within the present disclosure for metallized multilayer film to have a thickness of less than about 1 mil and the OTR of the metallized multilayer film to fall within one of the following ranges: less than about 0.07 cc/100 in²/day, less than about 0.06 cc/100 in²/day, less than about 0.05 cc/100 in²/day, less than about 0.04 cc/100 in²/day, less than about 0.03 cc/100 in²/day, less than about 0.02 cc/100 in²/day, less than about 0.01 cc/100 in²/day, less than about 0.005 cc/100 in²/day, less than about 0.002 cc/100 in²/day, about 0.001 cc/100 in²/day to about 0.08 cc/100 in²/day, about 0.001 cc/100 in²/day to about 0.007 cc/100 in²/day, about 0.001 cc/100 in²/day to about 0.06 cc/100 in²/day, about 0.002 cc/100 in²/day to about 0.08 cc/100 in²/day, about 0.002 cc/100 in²/day to about 0.07 cc/100 in²/day, about 0.002 cc/100 in²/day to about 0.06 cc/100 in²/day, about 0.005 cc/100 in²/day to about 0.08 cc/100 in²/day, about 0.005 cc/100 in²/day to about 0.07 cc/100 in²/day, and about 0.005 cc/100 in²/day to about 0.06 cc/100 in²/day.

In some embodiments, the metallized multilayer film has a thickness of about 0.6 mil to about 1 mil, and provides an oxygen transmission rate (OTR) of about 0.002 cc/100 in²/day. The metallized multilayer film may have a thickness of about 0.6 mil to about 1 mil, and the OTR of the metallized multilayer film may be one of several different values or fall within one of several different ranges. The metallized multilayer film may have a thickness of less than about 1 mil and the OTR of the metallized multilayer film may be one of the following values: about 0.001 cc/100 in²/day, about 0.002 cc/100 in²/day, about 0.003 cc/100 in²/day, about 0.004 cc/100 in²/day, about 0.005 cc/100 in²/day, about 0.006 cc/100 in²/day, about 0.007 cc/100 in²/day, about 0.008 cc/100 in²/day, about 0.009 cc/100 in²/day, about 0.01 cc/100 in²/day, about 0.02 cc/100 in²/day, and about 0.03 cc/100 in²/day. It is within the present disclosure for metallized multilayer film to have a thickness of about 0.6 mil to about 1 mil, and the OTR of the metallized multilayer film to fall within one of the following ranges: less than about 0.07 cc/100 in²/day, less than about 0.06 cc/100 in²/day, less than about 0.05 cc/100 in²/day, less than about 0.04 cc/100 in²/day, less than about 0.03 cc/100 in²/day, less than about 0.02 cc/100 in²/day, less than about 0.01 cc/100 in²/day, less than about 0.005 cc/100 in²/day, less than about 0.002 cc/100 in²/day, about 0.001 cc/100 in²/day to about 0.08 cc/100 in²/day, about 0.001 cc/100 in²/day to about 0.007 cc/100 in²/day, about 0.001 cc/100 in²/day to about 0.06 cc/100 in²/day, about 0.002 cc/100 in²/day to about 0.08 cc/100 in²/day, about 0.002 cc/100 in²/day to about 0.07 cc/100 in²/day, about 0.002 cc/100 in²/day to about 0.06 cc/100 in²/day, about 0.005 cc/100 in²/day to about 0.08 cc/100 in²/day, about 0.005 cc/100 in²/day to about 0.07 cc/100 in²/day, and about 0.005 cc/100 in²/day to about 0.06 cc/100 in²/day.

Surprisingly, it was found that a metallized multilayer film according to embodiments of the present disclosure, having a thickness of 0.9 mil provided a WVTR of less than about 0.03 g/100 in²/day and an OTR of less than about 0.02 cc/100 in²/day.

The coated or "metallized" multilayer film, such as metallized blocked multilayer film or metallized non-blocked multilayer film, according to exemplary embodiments of the present disclosure satisfies a long-felt need for a film that includes many if not all the features of barrier performance, ready for recyclability, high heat resistance, and faster packaging speeds. Others have failed to provide a multilayer film that achieves combinations of these features as reflected in the appended claims. This failure is a result of the many features being associated with competitive design choices. As an example, others have created films that based on design choices possess barrier performance but fail to provide comparable heat resistance and recyclability. In comparison, coated or "metallized" multilayer film of the present disclosure overcomes the failures of others by using a barrier layer including EVOH on the outer surface of the multilayer film, coated with a metal layer to further improve barrier performance while maintaining recyclability.

Various embodiments are provided throughout the present disclosure. It will be understood that any of the embodiments described herein can be used in connection with any other embodiments described herein to the extent that the embodiments do not contradict one another. The following numbered clauses include embodiments that are contemplated and non-limiting:

Clause 1. A multilayer film comprising a barrier layer.

Clause 1.1. The multilayer film of clause 1, any other clause or any combination of suitable clauses, wherein the barrier layer is arranged to provide an outer surface.

Clause 1.2. The multilayer film of clause 1.1, any other clause or any combination of suitable clauses, first comprising a first layer.

Clause 1.3. The multilayer film of clause 1.2, any other clause or any combination of suitable clauses, further comprising a tie layer.

Clause 1.4. The multilayer film of clause 1.3, any other clause or any combination of suitable clauses, wherein the tie layer is arranged to extend between and interconnect the barrier layer and the first layer.

Clause 1.5. The multilayer film of clause 1.4, any other clause or any combination of suitable clauses, wherein the barrier layer comprises a polar polymer resin.

Clause 2. A multilayer film comprising a first barrier layer.

Clause 2.1. The multilayer film of clause 2, any other clause or any combination of suitable clauses, wherein the first barrier layer is arranged to provide a first outer surface.

Clause 2.2. The multilayer film of clause 2.1, any other clause or any combination of suitable clauses, further comprising a core layer.

Clause 2.3. The multilayer film of clause 2.2, any other clause or any combination of suitable clauses, further comprising a second barrier layer.

Clause 2.4. The multilayer film of clause 2.3, any other clause or any combination of suitable clauses, wherein the second barrier layer is arranged to provide a second outer surface.

Clause 2.5. The multilayer film of clause 2.4, any other clause or any combination of suitable clauses, further comprising a first tie layer.

Clause 2.6. The multilayer film of clause 2.5, any other clause or any combination of suitable clauses, wherein the first tie layer is arranged to extend between and interconnect the first barrier layer and the core layer.

Clause 2.7. The multilayer film of clause 2.6, any other clause or any combination of suitable clauses, further comprising a second tie layer.

Clause 2.8. The multilayer film of clause 2.7, any other clause or any combination of suitable clauses, wherein the second tie layer is arranged to extend between and interconnect the second barrier layer and the core layer.

Clause 2.9. The multilayer film of clause 2.8, any other clause or any combination of suitable clauses, wherein the first barrier layer comprises a polar polymer resin.

Clause 2.10. The multilayer film of clause 2.8, any other clause or any combination of suitable clauses, wherein the second barrier layer comprises a polar polymer resin.

Clause 2.11. The multilayer film of clause 2.8, any other clause or any combination of suitable clauses, wherein each of the first barrier layer and the second barrier resin independently comprise a polar polymer resin.

Clause 3. A multilayer film comprising a barrier layer.

Clause 3.1 The multilayer film of clause 3, any other clause or any combination of suitable clauses, wherein the barrier layer is arranged to provide a first outer surface.

Clause 3.2. The multilayer film of clause 3.1, any other clause or any combination of suitable clauses, first comprising a core layer.

Clause 3.3. The multilayer film of clause 3.2, any other clause or any combination of suitable clauses, further comprising a skin layer.

Clause 3.4. The multilayer film of clause 3.3, any other clause or any combination of suitable clauses, wherein the skin layer is arranged to provide a second outer surface.

Clause 3.5. The multilayer film of clause 3.4, any other clause or any combination of suitable clauses, further comprising a tie layer.

Clause 3.6. The multilayer film of clause 3.5, any other clause or any combination of suitable clauses, wherein the tie layer is arranged to extend between and interconnect the barrier layer and the core layer.

Clause 3.7. The multilayer film of clause 3.6, any other clause or any combination of suitable clauses, wherein the barrier layer comprises a polar polymer resin.

Clause 4. The multilayer film of any one of clauses 1 to 3, any other suitable clause, or any combination of suitable clauses, wherein the polar polymer resin has a melting point of greater than about 160° C.

Clause 5. The multilayer film of any one of clauses 1 to 4, any other suitable clause, or any combination of suitable clauses, wherein the polar polymer resin comprises ethylene-vinyl alcohol copolymer (EVOH) or polyamide (e.g., nylon).

Clause 6. A multilayer film comprising a barrier layer.

Clause 6.1 The multilayer film of clause 6, any other clause or any combination of suitable clauses, wherein the barrier layer is arranged to provide an outer surface.

Clause 6.2 The multilayer film of clause 6.1, any other clause or any combination of suitable clauses, first comprising a first layer.

Clause 6.3 The multilayer film of clause 6.2, any other clause or any combination of suitable clauses, further comprising a tie layer.

Clause 6.4 The multilayer film of clause 6.3, any other clause or any combination of suitable clauses, wherein the tie layer is arranged to extend between and interconnect the barrier layer and the first layer.

Clause 6.5 The multilayer film of clause 6.4, any other clause or any combination of suitable clauses, wherein the barrier layer comprises ethylene-vinyl alcohol copolymer (EVOH).

Clause 7. A multilayer film comprising a first barrier layer.

Clause 7.1. The multilayer film of clause 7, any other clause or any combination of suitable clauses, wherein the first barrier layer is arranged to provide a first outer surface.

Clause 7.2. The multilayer film of clause 7.1, any other clause or any combination of suitable clauses, further comprising a core layer.

Clause 7.3. The multilayer film of clause 7.2, any other clause or any combination of suitable clauses, further comprising a second barrier layer.

Clause 7.4. The multilayer film of clause 7.3, any other clause or any combination of suitable clauses, wherein the second barrier layer is arranged to provide a second outer surface.

Clause 7.5. The multilayer film of clause 7.4, any other clause or any combination of suitable clauses, further comprising a first tie layer.

Clause 7.6. The multilayer film of clause 7.5, any other clause or any combination of suitable clauses, wherein the first tie layer is arranged to extend between and interconnect the first barrier layer and the core layer.

Clause 7.7. The multilayer film of clause 7.6, any other clause or any combination of suitable clauses, further comprising a second tie layer.

Clause 7.8. The multilayer film of clause 7.7, any other clause or any combination of suitable clauses, wherein the second tie layer is arranged to extend between and interconnect the second barrier layer and the core layer.

Clause 7.9. The multilayer film of clause 7.8, any other clause or any combination of suitable clauses, wherein the first barrier layer comprises ethylene-vinyl alcohol copolymer (EVOH).

Clause 7.10. The multilayer film of clause 7.8, any other clause or any combination of suitable clauses, wherein the second barrier layer comprises ethylene-vinyl alcohol copolymer (EVOH).

Clause 7.11. The multilayer film of clause 7.8, any other clause or any combination of suitable clauses, wherein each of the first barrier layer and the second barrier resin independently comprise ethylene-vinyl alcohol copolymer (EVOH).

Clause 8. A multilayer film comprising
a barrier layer arranged to provide a first outer surface,
a core layer,
a skin layer arranged to provide a second outer surface, and
a first tie layer arranged to extend between and interconnect the barrier layer and the core layer,
wherein the barrier layer comprises ethylene-vinyl alcohol copolymer (EVOH).

Clause 9. The multilayer film of clause 2 or 7, any other suitable clause, or any combination of suitable clauses, wherein each of the first barrier layer and the second barrier layer independently comprise at least 60 wt %, at least 80 wt %, or at least 95 wt % EVOH of the first barrier layer and the second barrier layer.

Clause 10. The multilayer film of clause 2 or 7, any other suitable clause, or any combination of suitable clauses, wherein the first barrier layer and the second barrier layer comprise the same composition.

Clause 11. The multilayer film of any one of clauses 1, 3, 6 or 8, any other suitable clause, or any combination of suitable clauses, wherein the barrier layer comprises at least 60 wt %, at least 80 wt %, or at least 95 wt % EVOH of the barrier layer.

Clause 12. The multilayer film of any one of the preceding clauses, any other suitable clause, or any combination of suitable clauses, wherein the multilayer film comprises about 3 vol % to about 20 vol %, about 8 vol % to about 15 vol %, or about 6 vol % to about 10 vol % EVOH of the multilayer film.

Clause 13. The multilayer film of clause 1 or 6, any other suitable clause, or any combination of suitable clauses, wherein the first layer is a core layer.

Clause 14. The multilayer film of any one of clauses 2, 3, 7, 8, or 13, any other suitable clause, or any combination of suitable clauses, wherein the core layer comprises polyethylene.

Clause 15. The multilayer film of clause 14, any other suitable clause, or any combination of suitable clauses, wherein the core layer comprises low density polyethylene (LDPE), medium density polyethylene (MDPE), high density polyethylene (HDPE), or any combination thereof.

Clause 15.1. The multilayer film of clause 14, any other suitable clause, or any combination of suitable clauses, wherein the core layer comprises high density polyethylene (HDPE), medium density polyethylene (MDPE), linear medium density polyethylene (LMDPE), metallocene medium density polyethylene (mMDPE), metallocene linear medium density polyethylene (mLMDPE), low density polyethylene (LDPE), linear low density polyethylene (LLDPE), metallocene linear low density polyethylene (mLLDPE), or any combination thereof.

Clause 15.2. The multilayer film of clause 14, any other suitable clause, or any combination of suitable clauses, wherein the core layer comprises high density polyethylene (HDPE), medium density polyethylene (MDPE), linear medium density polyethylene (LMDPE), or any combination thereof.

Clause 16. The multilayer film of any one of clauses 2, 3, 7, 8, or 13, any other suitable clause, or any combination of suitable clauses, wherein the core layer comprises at least one core sublayer, at least two core sublayers, at least three core sublayers, at least four core sublayers, at least five core sublayers, or at least six core sublayers.

Clause 17. The multilayer film of any one of the preceding clauses, any other suitable clause, or any combination of suitable clauses, wherein the multilayer film comprises a blocked configuration.

Clause 18. The multilayer film of clause 17, any other suitable clause, or any combination of suitable clauses, wherein the core layer comprises at least one core sublayer, and a blocking layer.

Clause 19. The multilayer film of any one of the preceding clauses, any other suitable clause, or any combination of suitable clauses, wherein the multilayer film comprises a non-blocked configuration.

Clause 20. The multilayer film of clause 1 or 6, any other suitable clause, or any combination of suitable clauses, wherein the multilayer film further comprises a skin layer, the skin layer arranged to provide a second outer surface.

Clause 21. The multilayer film of any one of the preceding clauses, any other suitable clause, or any combination of suitable clauses, wherein the multilayer film has a water vapor transmission rate (WVTR) of less than about 0.6 g/100 in$^2$/day.

Clause 22. The multilayer film of any one of the preceding clauses, any other suitable clause, or any combination of suitable clauses, wherein the multilayer film has an oxygen transmission rate (OTR) of less than about 0.07 cc/100 in$^2$/day.

Clause 23. The multilayer film of any one of clauses 1, 3, 6 or 8, further comprising a coating coupled to the outer surface of the barrier layer.

Clause 24. The multilayer film of clause 2 or 7, further comprising a coating coupled to the outer surface of the first barrier layer, the second barrier layer, or the first barrier layer and the second barrier layer.

Clause 25. The multilayer film of clause 23 or 24, any other suitable clause, or any combination of suitable clauses, wherein the coating is selected from a metal or a metal oxide, acrylic, polyvinyl alcohol (PVOH), and polyvinylidene chloride (PVDC).

Clause 26. The multilayer film of clause 23, 24, or 25, any other suitable clause, or any combination of suitable clauses, any other suitable clause, or any combination of suitable clauses, wherein the coating is a metal or metal oxide.

Clause 27. The multilayer film of clause 25 or 26, any other suitable clause, or any combination of suitable clauses, wherein the metal or metal oxide is selected from aluminum, aluminum oxide, and silicon oxide.

Clause 28. The multilayer film of any one of the preceding clauses, any other suitable clause, or any combination of suitable clauses, wherein the multilayer film has a thickness of about 0.35 mil to about 2 mil, about 0.6 mil to about 1.0 mil, or about 0.6 mil to about 2.0 mil.

Clause 29. The multilayer film of any one of the preceding clauses, any other suitable clause, or any combination of suitable clauses, wherein the multilayer film has a water vapor transmission rate (WVTR) of less than about 0.04 g/100 in$^2$/day.

Clause 30. The multilayer film of any one of the preceding clauses, any other suitable clause, or any combination of suitable clauses, wherein the multilayer film has an oxygen transmission rate (OTR) of less than about 0.04 cc/100 in$^2$/day.

Clause 31. The multilayer film of any one of the preceding clauses, any other suitable clause, or any combination of suitable clauses, wherein the multilayer film is a cast film (i.e., a film provided by a cast film extrusion process) or a blown film (i.e., a film provided by a blown film extrusion process).

Clause 32. The multilayer film of any one of the preceding clauses, any other suitable clause, or any combination of suitable clauses, wherein the multilayer film provides at least 40 degrees OF or more heat stability compared to a comparative PE-based oriented films lacking a barrier layer comprising EVOH.

Clause 33. The multilayer film of any one of the preceding clauses, any other suitable clause, or any combination of suitable clauses, wherein the multilayer film is recyclable.

Clause 34. A method for preparing the multilayer film according to any one of the preceding clauses, the method comprising the steps of extruding three or more extrudable materials through a die to form a molten extrudate, cooling the molten extrudate to form a film, and stretching the film in a direction to provide a machine direction oriented film.

Clause 35. The method of clause 34, any other suitable clause, or any combination of suitable clauses, wherein the three or more extrudable materials comprises a first extrudable material comprising a polar polymer resin, a second extrudable material, and a third extrudable material.

Clause 36. The method of clause 35, any other suitable clause, or any combination of suitable clauses, wherein the polar polymer resin has a melting point of greater than about 160° C.

Clause 37. The method of clause 35 or 36, any other suitable clause, or any combination of suitable clauses, wherein the polar polymer resin comprises ethylene-vinyl alcohol copolymer (EVOH) or polyamide (e.g., nylon).

Clause 38. The method of any one of clauses 34-37, any other suitable clause, or any combination of suitable clauses, wherein the three or more extrudable materials comprises a first extrudable material comprising EVOH, a second extrudable material, and a third extrudable material.

Clause 39. The method of any one of clauses 34-38, any other suitable clause, or any combination of suitable clauses, wherein the multilayer film is a cast film or a blown film.

Clause 40. The method of any one of clauses 34-39, any other suitable clause, or any combination of suitable clauses, wherein the die is a flat die, and after the cooling step, the film is a cast film.

Clause 41. The method of any one of clauses 34-39, any other suitable clause, or any combination of suitable clauses, wherein the die is an annular die, and the method further comprises a step of blowing the molten extrudate to establish a blown film.

Clause 42. The method of clause 40, further comprising the step of collapsing the blown film upon itself, such that a first interior surface comprising the blocking layer of blown film adheres to an adjacent second interior surface comprising the blocking layer of the blown film via blocking.

Clause 43. The method of clause 41, further comprising the step of collapsing the blown film upon itself, such that a first interior surface comprising the skin layer of blown film is in contact with an adjacent second interior surface comprising the skin layer of the blown film, any other suitable clause, or any combination of suitable clauses, wherein the two adjacent skin layers do not fuse together.

Clause 44. The method of any one of clauses 34 to 43, further comprising coating an outer surface of the machine direction oriented film to provide a coating deposited on the outer surface of the machine direction oriented film.

Clause 45. The method of clause 44, any other suitable clause, or any combination of suitable clauses, wherein the coating is selected from a metal or a metal oxide, acrylic, polyvinyl alcohol (PVOH), and polyvinylidene chloride (PVDC).

Clause 46. The method of clause 44 or 45, any other suitable clause, or any combination of suitable clauses, wherein the coating is a metal or metal oxide.

Clause 47. The method of clause 44, 45, or 46, any other suitable clause, or any combination of suitable clauses, wherein the metal or metal oxide is selected from aluminum, aluminum oxide, and silicon oxide.

Clause 48. A laminate comprising the multilayer film according to any one of clauses 1-33.

Clause 48.1 The laminate of clause 48, any other suitable clause, or any combination of suitable clauses, further comprising a second film.

Clause 48.2 The laminate of clause 48.1, any other suitable clause, or any combination of suitable clauses, further optionally comprising an adhesive.

Clause 48.3 The laminate of clause 48.2, any other suitable clause, or any combination of suitable clauses, wherein the adhesive extends between and interconnects the multilayer film and the second film.

Clause 49. The laminate of clause 48, any other suitable clause, or any combination of suitable clauses, wherein the second film comprises a print film, a sealable film, or a second multilayer film comprising the multilayer film according to any one of clauses 1-32.

Clause 50. The laminate of clause 48 or 49, any other suitable clause, or any combination of suitable clauses, further comprising a third film and optionally a second adhesive extending between and interconnecting the third film to the laminate.

Clause 51. The laminate of clause 50, any other suitable clause, or any combination of suitable clauses, wherein the third film comprises a print film, a sealable film, a second multilayer film comprising the multilayer film according to any one of clauses 1-32, or a third multilayer film comprising the multilayer film according to any one of clauses 1-32.

Clause 52. The laminate of any one of clauses 48 to 51, any other suitable clause, or any combination of suitable clauses, wherein the laminate is recyclable.

Clause 53. A package formed from the multilayer film according to any one of clauses 1-33, comprising a pouch configured to hold a product, a first closure, and a second closure located in spaced-apart relation to the first closure.

Clause 54. A package formed from the laminate of any one of clauses 48-52, comprising a pouch configured to hold a product, a first closure, and a second closure located in spaced-apart relation to the first closure.

Clause 55. The package of clause 53 or 54, any other suitable clause, or any combination of suitable clauses, wherein the product is a food product, an industrial product, a cosmetic product, a paper product, or an electronic product.

EXAMPLES

The following examples and representative procedures illustrate features in accordance with the present disclosure, and are provided solely by way of illustration. They are not intended to limit the scope of the appended claims or their equivalents. Parts and percentages appearing in such examples are by volume, or thickness, unless otherwise stipulated. All ASTM, ISO, and other standard test methods cited or referred to in this disclosure are incorporated by reference in their entirety.

Example 1

An exemplary blocked multilayer film in accordance with certain aspects of the present disclosure is provided in the instant example. The multilayer film in this example is a 17-layered blocked multilayer film formed by blocking a 9-layer co-extruded film. For purposes of illustration, each sublayer of the multilayer film is numbered successively in reference to Table 1 of the present disclosure to correlate the sublayer composition with the sublayer thickness. The instant example is provided to evaluate the composition and thickness parameters of the exemplary multilayer film.

The exemplary Film A was provided by orienting and stretching in the machine direction to yield a film with thickness of 0.900 mil. Film A, can be provided by orienting a film with an initial thickness of 2.250 mil.

TABLE 1

Formulation of Film A

| Layer | Percent | Resin Type | Trade Name |
|---|---|---|---|
| First Barrier | 6 | EVOH | Soarus Soarnol DC3203RB |
| First Tie | 5 | Adh-mPE | Mitsui Admer SF755A |
| First Core | 7.5 | mLMDPE-C8 | Dow Elite 5940G |
| Second Core | 4 | mLMDPE-C8 | Dow Elite 5940G |
| Third Core | 4 | mLMDPE-C8 | Dow Elite 5940G |
| Fourth Core | 4 | mLMDPE-C8 | Dow Elite 5940G |
| Fifth Core | 7 | mLMDPE-C8 | Dow Elite 5940G |
| Sixth Core | 7.5 | mLMDPE-C8 | Dow Elite 5940G |
| Blocking | 10 | POP | Dow Affinity PL1850G |
| Seventh Core | 7.5 | mLMDPE-C8 | Dow Elite 5940G |
| Eighth Core | 7 | mLMDPE-C8 | Dow Elite 5940G |
| Ninth Core | 4 | mLMDPE-C8 | Dow Elite 5940G |
| Tenth Core | 4 | mLMDPE-C8 | Dow Elite 5940G |
| Eleventh Core | 4 | mLMDPE-C8 | Dow Elite 5940G |
| Twelfth Core | 7.5 | mLMDPE-C8 | Dow Elite 5940G |
| Second Tie | 5 | Adh-mPE | Mitsui Admer SF755A |
| Second Barrier | 6 | EVOH | Soarus Soarnol DC3203RB |

TABLE 2

Properties of Film A

| Property | ASTM Method | Units | Typical Value |
|---|---|---|---|
| Density | | g/cc | 0.9612 |
| Gauge | D-2103 | mils | 0.90 |
| Yield | calculated | sq inches/pound | 32,011 |
| Basis Weight | calculated | pounds/ 3000 sq ft | 13.5 |
| Gloss 45 degree | D-2457 | GU | 74.4 |
| Haze | D-1003 | percent | 6 |
| Coefficient of Friction (Film to film; out-out) | D-1894 | ratio | 0.38 |
| Coefficient of Friction (Film to film; in-in) | D-1894 | ratio | 0.35 |
| Tensile, Break MD | D-882 | psi | 20,668 |
| Tensile, Break TD | D-882 | psi | 2,856 |
| Elongation, Break MD | D-882 | percent | 20 |
| Elongation, Break TD | D-882 | percent | 265 |
| 1% Secant Modulus MD | D-882 | psi | 229,927 |
| 1% Secant Modulus TD | D-882 | psi | 197,753 |
| Elmendorf Tear MD | D-1922 | grams | 18 |
| Elmendorf Tear TD | D-1922 | grams | 86 |
| Slow Puncture | D-7192 | grams | 1,314 |
| WVTR @ 100° F./90% rh | F.-1249 | g/100 sq in/day | 0.50 |
| OTR @ 73° F./0% rh | D-3985 | cc/100 sq in/day | 0.04 |
| Shrink MD 212° F./30 sec | Berry Std | percent | 2 |
| Shrink TD 212° F./30 sec | Berry Std | percent | 0 |
| Seals, Shrink MD 212° F./30 sec | Berry Std | percent | 2.33 |
| Seals, Shrink TD 212° F./30 sec | Berry Std | percent | 0.00 |

An exemplary blocked multilayer film in accordance with certain aspects of the present disclosure is provided in the instant example. The multilayer film in this example is a 17-layered blocked multilayer film formed by blocking a 9-layer co-extruded film. For purposes of illustration, each sublayer of the multilayer film is numbered successively in reference to Table 3 of the present disclosure to correlate the sublayer composition with the sublayer thickness. The instant example is provided to evaluate the composition and thickness parameters of the exemplary multilayer film.

Example 2

The exemplary Film B was provided by orienting and stretching in the machine direction to yield a film with thickness of 0.900 mil. Film B, can be provided by orienting a film with an initial thickness of 2.250 mil or 3.0 mil.

TABLE 3

Formulation of Film B

| Layer | Percent | Resin Type | Trade Name |
|---|---|---|---|
| First Barrier | 4 | EVOH | Soarus Soarnol DC3203RB |
| First Tie | 5 | Adh-mPE | Mitsui Admer SF755A |
| First Core | 8 | mLMDPE-C8 | Dow Elite 5940G |
| Second Core | 4 | mLMDPE-C8 | Dow Elite 5940G |
| Third Core | 4 | mLMDPE-C8 | Dow Elite 5940G |
| Fourth Core | 4 | mLMDPE-C8 | Dow Elite 5940G |
| Fifth Core | 8 | mLMDPE-C8 | Dow Elite 5940G |
| Sixth Core | 8 | mLMDPE-C8 | Dow Elite 5940G |
| Blocking | 10 | POP | Dow Affinity PL1850G |
| Seventh Core | 8 | mLMDPE-C8 | Dow Elite 5940G |
| Eighth Core | 8 | mLMDPE-C8 | Dow Elite 5940G |
| Ninth Core | 4 | mLMDPE-C8 | Dow Elite 5940G |
| Tenth Core | 4 | mLMDPE-C8 | Dow Elite 5940G |
| Eleventh Core | 4 | mLMDPE-C8 | Dow Elite 5940G |
| Twelfth Core | 8 | mLMDPE-C8 | Dow Elite 5940G |
| Second Tie | 5 | Adh-mPE | Mitsui Admer SF755A |
| Second Barrier | 4 | EVOH | Soarus Soarnol DC3203RB |

TABLE 4

Properties of Film B

| Property | ASTM Method | Units | Typical Value |
|---|---|---|---|
| Density | | g/cc | 0.9512 |
| Gauge | D-2103 | mils | 0.90 |
| Yield | calculated | sq inches/pound | 32,348 |
| Basis Weight | calculated | pounds/3000 sq ft | 13.4 |
| Gloss 45 degree | D-2457 | GU | 71.0 |
| Haze | D-1003 | percent | 7 |
| Coefficient of Friction (Film to film; out-out) | D-1894 | ratio | 0.40 |
| Coefficient of Friction (Film to film; in-in) | D-1894 | ratio | 0.40 |
| Tensile, Break MD | D-882 | psi | 18,680 |
| Tensile, Break TD | D-882 | psi | 2,946 |
| Elongation, Break MD | D-882 | percent | 25 |
| Elongation, Break TD | D-882 | percent | 632 |
| 1% Secant Modulus MD | D-882 | psi | 200,557 |
| 1% Secant Modulus TD | D-882 | psi | 183,300 |
| Elmendorf Tear MD | D-1922 | grams | 47 |
| Elmendorf Tear TD | D-1922 | grams | 86 |
| Slow Puncture | D-7192 | grams | 1,431 |
| WVTR @ 100° F./90% rh | F-1249 | g/100 sq in/day | 0.52 |
| OTR @ 73° F./0% rh | D-3985 | cc/100 sq in/day | 0.06 |
| Shrink MD | Berry Std | percent | 2 |
| Seals, Shrink MD | Berry Std | percent | 2.00 |

An exemplary multilayer film in accordance with certain aspects of the present disclosure is provided in the instant example. The multilayer film in this example is Film B of Example 2. Film B and a comparative MDOPE film were subjected to heat resistance testing, as shown in FIG. 14. The advantage in heat resistance was determined by comparing Heat Seal Curves created using an Instron and following the ASTM F88 method to test peel seal force. Those seals were sealed at a range of temperatures between 180° F. and 350° F. for 1 second at 60 PSI.

Example 3

Film B shows about a 40° F. to 50° F. improvement in heat resistance over comparative film. The heat resistance properties of the instant example are a significant improvement over the properties seen in comparative MDOPE films.

Example 4

An exemplary metallized multilayer film in accordance with certain aspects of the present disclosure is provided in the instant example. The non-coated multilayer film in this example is Film B of Example 2. Film B was subjected to a metallizing process to deposit a metal layer onto the surface of Film B, thereby forming the metallized multilayer film of the instant example. The measured values for MVTR and OTR are shown in the Table 5.

TABLE 5

Barrier Properties of Metallized Film B

| | OTR (cc/m²/day) | OTR (cc/100 in²/day) | Satisfactory Result |
|---|---|---|---|
| First Test | 0.198659 | 0.0128 | yes |
| First Test | 0.03613 | 0.0023 | yes |
| Second Test | 0.490056 | 0.0316 | no |
| Second Test | 0.030651 | 0.0020 | yes |
| | MVTR | MVTR | |

TABLE 5-continued

| | (g/m²/day) | (g/100 in²/day) | |
|---|---|---|---|
| First Test | 0.182666 | 0.0118 | yes |
| First Test | 0.389633 | 0.0251 | yes |
| Second Test | 0.231539 | 0.0149 | yes |
| Second Test | 0.327534 | 0.0211 | yes |

The barrier properties of the instant example are a significant improvement over the barrier properties seen in comparative MDOPE films lacking a barrier layer comprising EVOH. Previous attempts to metallize comparative MDOPE films resulted in MVTR values around 0.20 g/100 in²/day.

Example 5

An exemplary blocked multilayer film in accordance with certain aspects of the present disclosure is provided in the instant example. The multilayer film in this example is a 17-layered blocked multilayer film formed by blocking a 9-layer co-extruded film. For purposes of illustration, each sublayer of the multilayer film is numbered successively in reference to Table 6 of the present disclosure to correlate the sublayer composition with the sublayer thickness. The instant example is provided to evaluate the composition and thickness parameters of the exemplary multilayer film.

The exemplary Film C was provided by orienting and stretching in the machine direction to yield a film with thickness of 1.0 mil. Film C, can be provided by orienting a film with an initial thickness of 2.0 mil.

TABLE 6

Formulation of Film C

| Layer | Percent | Resin Type | Trade Name |
|---|---|---|---|
| First Barrier | 7.5 | Nylon 6/6, 6 | BASF Ultramid |
| First Tie | 7 | Adh-mPE | Mitsui Admer SF755A |
| First Core | 6 | mLMDPE-C8 | Dow Elite 5940G |
| Second Core | 4 | mLMDPE-C8 | Dow Elite 5940G |
| Third Core | 4 | mLMDPE-C8 | Dow Elite 5940G |
| Fourth Core | 4 | mLMDPE-C8 (88%) Compatibilizer (12%) | Dow Elite 5940G Ampacet Revive 311A |
| Fifth Core | 6.5 | mLMDPE-C8 Compatibilizer (12%) | Dow Elite 5940G Ampacet Revive 311A |
| Sixth Core | 6 | mLMDPE-C8 | Dow Elite 5940G |
| Blocking | 10 | POP | Dow Affinity PL1850G |
| Seventh Core | 6 | mLMDPE-C8 | Dow Elite 5940G |
| Eighth Core | 6.5 | mLMDPE-C8 Compatibilizer (12%) | Dow Elite 5940G Ampacet Revive 311A |
| Ninth Core | 4 | mLMDPE-C8 Compatibilizer (12%) | Dow Elite 5940G Ampacet Revive 311A |
| Tenth Core | 4 | mLMDPE-C8 | Dow Elite 5940G |
| Eleventh Core | 4 | mLMDPE-C8 | Dow Elite 5940G |
| Twelfth Core | 6 | mLMDPE-C8 | Dow Elite 5940G |
| Second Tie | 7 | Adh-mPE | Mitsui Admer SF755A |
| Second Barrier | 7.5 | Nylon 6/6, 6 | Ultramid |

The invention claimed is:

1. A method for preparing a machine direction oriented film, the method comprising the steps of
extruding three or more extrudable materials through a die to form a molten extrudate,
blowing the molten extrudate to establish a blown film, collapsing the blown film, such that a first interior surface of the blown film adheres to an adjacent second interior surface of the blown film, thereby forming a blocked film, and stretching the blocked film in a direction to provide a machine direction oriented film, wherein the machine direction oriented film comprises
- a first barrier layer arranged to provide a first outer surface, the first barrier layer comprising ethylene-vinyl alcohol copolymer (EVOH),
- a core layer, and
- a second barrier layer arranged to provide a second outer surface, the second barrier layer comprising EVOH.

2. The method of claim 1, wherein the three or more extrudable materials comprises a first extrudable material comprising EVOH, a second extrudable material, and a third extrudable material.

3. The method of claim 1, further comprising coating the first outer surface of the machine direction oriented film to provide a coating deposited on the first outer surface of the machine direction oriented film.

4. The method of claim 3, wherein the coating is selected from a metal or a metal oxide, acrylic, polyvinyl alcohol (PVOH), and polyvinylidene chloride (PVDC).

5. The method of claim 1, wherein the machine direction oriented film comprises about 3 vol % to about 30 vol % EVOH.

6. The method of claim 1, wherein the machine direction oriented film comprises about 8 vol % to about 15 vol % EVOH.

7. The method of claim 1, wherein the core layer comprises at least one core sublayer and a blocking layer.

8. The method of claim 1, wherein the machine direction oriented film comprises a first tie layer arranged to extend between and interconnect the first barrier layer and the core layer, and a second tie layer arranged to extend between and interconnect the second barrier layer and the core layer.

9. The method of claim 1, further comprising a step of laminating the machine direction oriented film to provide a laminate, the laminate comprising the machine direction oriented film and a second film, wherein the step of laminating comprises extrusion lamination or adhesive lamination.

10. The method of claim 1, wherein the machine direction oriented film has a thickness of about 0.6 mil to about 2.0 mil.

11. The method of claim 1, wherein the machine direction oriented film has a water vapor transmission rate (WVTR) of less than about 0.6 g/100 in$^2$/day.

12. The method of claim 1, wherein the machine direction oriented film has an oxygen transmission rate (OTR) of less than about 0.07 cc/100 in$^2$/day.

13. The method of claim 1, wherein the machine direction oriented film provides at least 40° F. or more heat resistance than a comparative PE-based oriented film that does not comprise a first barrier layer comprising EVOH.

14. The method of claim 6, wherein the machine direction oriented film is recyclable.

15. A method for preparing a laminate, the method comprising the steps of:

extruding three or more extrudable materials through a die to form a molten extrudate, blowing the molten extrudate to establish a blown film, collapsing the blown film, such that a first interior surface of the blown film adheres to an adjacent second interior surface of the blown film, thereby forming a blocked film, stretching the blocked film in a direction to provide a machine direction oriented film, wherein the machine direction oriented film comprises
- a first barrier layer arranged to provide a first outer surface, the first barrier layer comprising ethylene-vinyl alcohol copolymer (EVOH),
- a core layer,
- a second barrier layer arranged to provide a second outer surface, the second barrier layer comprising EVOH, and laminating the machine direction oriented film to provide a laminate, the laminate comprising the machine direction oriented film and a second film, wherein the second film is arranged to be in contact with the second barrier layer.

16. The method of claim 15, wherein the machine directed oriented film of the laminate comprises a blocked configuration.

17. The method of claim 15, wherein the laminate provides at least 40° F. or more heat resistance than a comparative PE-based oriented film that does not comprise a first barrier layer comprising EVOH.

18. The method of claim 15, wherein the laminate further comprises an adhesive extending between and interconnecting the machine direction oriented film and the second film.

19. The method of claim 15, wherein the step of laminating comprises extrusion lamination.

20. The method of claim 15, wherein the laminate is recyclable.

* * * * *